(12) United States Patent
Kang et al.

(10) Patent No.: US 11,042,489 B2
(45) Date of Patent: Jun. 22, 2021

(54) DATA ENCRYPTION METHOD AND ELECTRONIC APPARATUS PERFORMING DATA ENCRYPTION METHOD

(71) Applicant: SAMSUNG ELECTRONICS CO., LTD., Suwon-si (KR)

(72) Inventors: Woo-seok Kang, Suwon-si (KR); Eun-kyoung Park, Seoul (KR); Seok-hwan Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 16/168,216

(22) Filed: Oct. 23, 2018

(65) Prior Publication Data

US 2019/0121749 A1  Apr. 25, 2019

(30) Foreign Application Priority Data

Oct. 23, 2017 (KR) .................. 10-2017-0137377

(51) Int. Cl.
*G06F 12/14* (2006.01)
*G06F 12/0811* (2016.01)
*G06F 12/02* (2006.01)

(52) U.S. Cl.
CPC ...... *G06F 12/1408* (2013.01); *G06F 12/0246* (2013.01); *G06F 12/0811* (2013.01);
(Continued)

(58) Field of Classification Search
CPC ............ G06F 12/1408; G06F 12/0246; G06F 12/0811; G06F 2212/1052; G06F 2212/402; G06F 2212/455
(Continued)

(56) References Cited

U.S. PATENT DOCUMENTS 8,806,199 B2    8/2014 von Behren et al.
9,928,385 B2 *  3/2018 Hars ................. G06F 21/00
(Continued)

FOREIGN PATENT DOCUMENTS

EP    2 966 628 A1    1/2016
EP    3185464 A1      6/2017
(Continued)

OTHER PUBLICATIONS

Zuo et al., "Improving the Performance and Endurance of Encrypted Non-volatile Main Memory through Deduplicating Writes", 2018 51st Annual IEEE/ACM International Symposium on Microarchitecture, pp. 442-454 Mar. 2018 (Year: 2018).*

(Continued)

*Primary Examiner* — Khalil Naghdali

(74) *Attorney, Agent, or Firm* — Sughrue Mion, PLLC

(57) ABSTRACT

An electronic apparatus that writes encrypted data includes a first memory; a second memory configured to update encryption information including address information indicating a write location on the first memory and a parameter for use in encryption when data is encrypted and written to the first memory, and store the updated encryption information; an encryption and decryption unit configured to encrypt the data, based on the encryption information; and a processor configured to control the encrypted data to be written to the first memory, thereby increasing a safety level.

20 Claims, 13 Drawing Sheets

(52) U.S. Cl.
CPC ............... *G06F 2212/1052* (2013.01); *G06F 2212/402* (2013.01); *G06F 2212/455* (2013.01)

(58) Field of Classification Search
USPC ......................................................... 713/193
See application file for complete search history.

(56) References Cited

U.S. PATENT DOCUMENTS

| | | | | |
|---|---|---|---|---|
| 10,409,715 | B2* | 9/2019 | Bae | ................... G06F 12/0246 |
| 2003/0033537 | A1 | 2/2003 | Fujimoto et al. | |
| 2003/0046593 | A1 | 3/2003 | Xie et al. | |
| 2011/0154061 | A1 | 6/2011 | Chilukuri et al. | |
| 2011/0208979 | A1* | 8/2011 | Saarinehn | ............... G06F 21/78 |
| | | | | 713/193 |
| 2013/0013934 | A1 | 1/2013 | King et al. | |
| 2013/0117577 | A1* | 5/2013 | Hars | ....................... G06F 21/85 |
| | | | | 713/190 |
| 2015/0012708 | A1* | 1/2015 | Rubinstein | ........... H04N 19/105 |
| | | | | 711/125 |
| 2015/0220456 | A1 | 8/2015 | Fel | |
| 2016/0085692 | A1 | 3/2016 | Kwok | |
| 2017/0046281 | A1 | 2/2017 | Chandra et al. | |
| 2017/0185809 | A1* | 6/2017 | Kishinevsky | ....... G06F 12/1425 |
| 2017/0220487 | A1* | 8/2017 | Jung | ................... G06F 12/1408 |

FOREIGN PATENT DOCUMENTS

| | | |
|---|---|---|
| JP | 4080079 B2 | 4/2008 |
| KR | 10-0487509 B1 | 6/2005 |
| KR | 10-1533787 B1 | 7/2015 |

OTHER PUBLICATIONS

Awad et al. "ObfusMem: A Low-Overhead Access Obfuscation for Trusted Memories", IEEE conferenced Jun. 2017 ACM/IEEE 44th ISCA '17, Jun. 24-28, 2017, Toronto, ON, Canada, pp. 107-109 (Year: 2017).*

Lee et al., "FESSD: A Fast Encrypted SSD Employing On-Chip Access-Control Memory", IEEE Computer Architecture Letters, vol. 16, No. 2, Jul.-Dec. 2017, pp. 115-118 (Year: 2017).*

International Search Report (PCT/ISA/210) and Written Opinion (PCT/ISA/237) dated Feb. 27, 2019 issued by the International Searching Authority in International Application No. PCT/KR2018/012573.

Communication dated Aug. 10, 2020, issued by the European Patent Office in European Application No. 18869982.1.

* cited by examiner

DATA ENCRYPTION METHOD AND ELECTRONIC APPARATUS PERFORMING DATA ENCRYPTION METHOD

CROSS-REFERENCE TO RELATED APPLICATION(S)

This application is based on and claims priority under 35 U.S.C. § 119 to Korean Patent Application No. 10-2017-0137377, filed on Oct. 23, 2017, in the Korean Intellectual Property Office, the disclosure of which is incorporated by reference herein in its entirety.

BACKGROUND

1. Field

The disclosure relates to a data encryption method and an electronic apparatus that performs the data encryption method.

In detail, the disclosure relates to a data encryption method for encrypting data and writing and storing the encrypted data in memory, and an electronic apparatus that performs the data encryption method.

2. Description of the Related Art

Electronic apparatuses, such as computers, smartphones, tablet personal computers (PCs), and personal digital assistants (PDAs), are frequently used by their users. As electronic apparatuses become increasingly popular, personal information of a user or user-related information stored in an electronic apparatus also correspondingly increases as improvements and new functions of the electronic apparatuses are developed. Accordingly, encryption technology is employed to protect data written to and stored in the electronic apparatus, in effort to prevent unauthorized access to the data stored therein.

For example, encryption technology is being actively applied to storage media, such as hard disc drives (HDDs), to protect personal information or user-related information.

Because memory devices, such as random access memory (RAM), usually store important data that is to be protected against being hacked, the data stored in RAM needs to be encrypted for security. For example, RAM may store personal information of a user or content having a copyright, and unauthorized access to this data needs to be prevented.

In detail, unauthorized access to data within RAM may occur via software hacking or physical hacking. The software hacking may occur, for example, via an unauthorized data dump via malignant software, and the physical hacking may occur, for example, via probing of contact lines of a memory chip.

Although RAM is a volatile memory device and thus has a characteristic of stored data being lost after power supply is stopped, even after power is removed, RAM stores data for a certain period of time. In particular, as an ambient environment temperature decreases, the time during which data is stored after power is removed correspondingly increases. Accordingly, there is a possibility that data may still be accessed during a certain period of time after power supply to RAM is stopped.

Therefore, to protect data written to memory devices, such as RAM, encryption may be employed. However, when data is encrypted and written to a memory device, and subsequently encrypted data is read and decrypted, access performance of a device and security of the data stored therein needs to be maintained.

SUMMARY

One or more embodiments of the disclosure relate to a data encryption method capable of minimizing access performance degradation that occurs during encryption and writing of data to a random access memory (RAM) and decryption of the data written to the RAM, and an electronic apparatus that performs the data encryption method.

One or more embodiments of the disclosure relate to a data encryption method capable of increasing a security level of encrypted data written to a RAM, and an electronic apparatus that performs the data encryption method.

Additional aspects of the disclosure will be set forth in part in the description which follows and, in part, will be apparent from the description, or may be learned by practice of the presented embodiments.

In accordance with an aspect of the disclosure, an electronic apparatus may include a first memory; a second memory configured to store encryption information comprising address information indicating a write location of data on the first memory device and a parameter for encrypting the data; an encryption and decryption unit configured to encrypt the data, based on the encryption information; and a processor configured to control the encrypted data to be written to the write location on the first memory device.

When a write request for writing supplemental data to the first memory device is received, the second memory device may be further configured to update at least one of the address information and the parameter for encrypting the data, based on the write request.

The second memory device may be further configured to generate first encryption information that is applied when the data is written to the first memory device at a first time point, and second encryption information that is applied when the supplemental data is written to the first memory device at a second time point different from the first time point, such that the first encryption information is different from the second encryption information.

The data encrypted at the first time point may have a different value from the supplemental data encrypted at the second time point.

The address information may include at least two of a start address, an end address, and size information of a memory area from the start address to the end address.

The second memory device may include a plurality of memory areas and a cache memory having a structure consisting of a plurality of layers, and the encryption information may be stored in a memory area among the plurality of memory areas corresponding to a layer among the plurality of layers.

When supplemental data is encrypted and written to the first memory device, the second memory device may store supplemental encryption information in a memory area among the plurality of memory areas corresponding to a layer among the plurality of layers that is lower than the layer on which the encryption information is stored.

When supplemental data is encrypted and written to the first memory device, the second memory device may additionally store the supplemental encryption information in the memory area among the plurality of memory areas corresponding to the layer among the plurality of layers on which the encryption information is stored.

The encryption information may include first layer encryption information comprising the encryption information corresponding to the data; and second layer encryption information comprising encryption information corresponding to supplemental data.

The second memory device may be further configured to obtain update address information on the first memory device corresponding to a write request with respect to supplemental data which is to be stored in the first memory, and update the encryption information, based on an initial address indicating a location of a first area on which the data is stored in the first memory and the update address information.

When a read request of the data written to the first memory device is received, the second memory device may be further configured to search for the encryption information corresponding to the data in response to receiving the read request. The processor may be further configured to control data to read the data from the first memory device and decrypt the data, based on the encryption information.

The data may include image frame data, and the processor may be further configured to control a plurality of image frames included in the image frame data to be written to the first memory device according to a circular queue method.

The second memory device may include a cache memory having a structure of two layers, and may store the encryption information in the cache memory according to a circular queue method when encrypting and storing the plurality of image frames to the first memory device.

The first memory device may store at least one piece of data in units of blocks, and the address information may include information indicating a location of a block formed between a start address of the block and an end address of the block.

The first memory device may be random access memory (RAM), and the second memory device may be a cache.

In accordance with another aspect of the disclosure, a data encryption method may include generating encryption information comprising address information indicating a write location on a first memory device and a parameter for encrypting data, in response to receiving a request to write the data to the first memory device; encrypting the data, based on the encryption information; and writing the encrypted data to the write location on the first memory device.

The generating may include, when a write request for writing supplemental data to the first memory device is received, update at least one of the address information and the parameter for encrypting the data, based on the write request; and storing the updated encryption information to a cache memory.

The generating may further include generating encryption information that is applied when the data is written to the first memory device at a first time point, and second encryption information that is applied when the supplemental data is written to the first memory device at a second time point different from the first time point, such that the first encryption information is different from the second encryption information.

The method may include storing the encryption information in a memory area among a plurality of memory areas of the first memory device corresponding to a layer among a plurality of layers within the cache memory.

The data may include image frame data including a plurality of image frames, and the writing may include writing the plurality of image frames to the first memory device according to a circular queue method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Embodiments of the disclosure may be described in terms of functional block components and various processing steps. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any software programming or scripting language. The functional blocks may be implemented in hardware or software algorithms that are executed on one or more processors. Furthermore, the disclosure described herein could employ any number of techniques according to the related art for electronics configuration, signal processing and/or control, data processing and the like.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

The terms " . . . or(er)", " . . . interface", " . . . module", and " . . . device" when used in this specification refers to a unit in which at least one function or In operation is performed, and may be implemented as hardware, software, or a combination of hardware and software. The terms " . . . or(er)", " . . . interface", and " . . . module" may be stored in an addressable storage medium and may be implemented by a computer program that may be executed by a processor.

For example, the " . . . or(er)", " . . . interface", " . . . module", and " . . . device" may be implemented by object-oriented software components, class components, and task components, and processes, functions, attributes, procedures, subroutines, segments of a program code, drivers, firmware, a micro code, a circuit, data, a database, data structures, tables, arrays, and variables.

There are many various methods of encrypting pieces of data stored in a memory device. Examples of a memory device capable of storing encrypted data include a volatile memory device and a non-volatile memory device. Examples of the volatile memory device may include random access memory (RAM), and examples of the non-volatile memory device may include flash memory, read only memory (ROM), a magnetic computer storage device (for example, a hard disk), and an optical disk drive. Embodiments of the disclosure describe that RAM is used as a memory device for writing and reading encrypted data, but the selection of RAM is merely exemplary.

Figure 1:
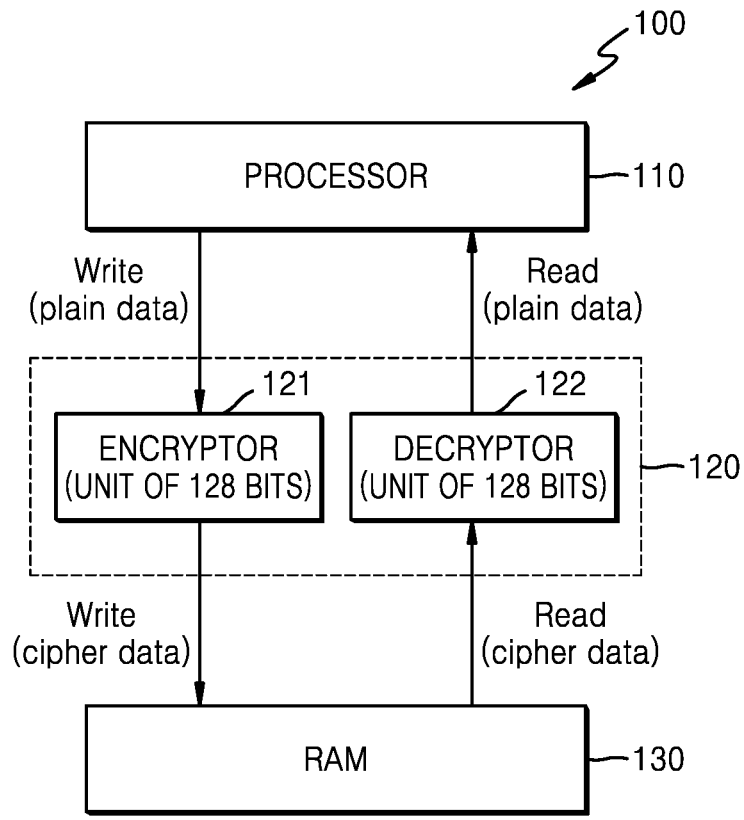
FIG. 1 is a block diagram of an electronic apparatus for writing encrypted data, according to an embodiment.
Figure 2:
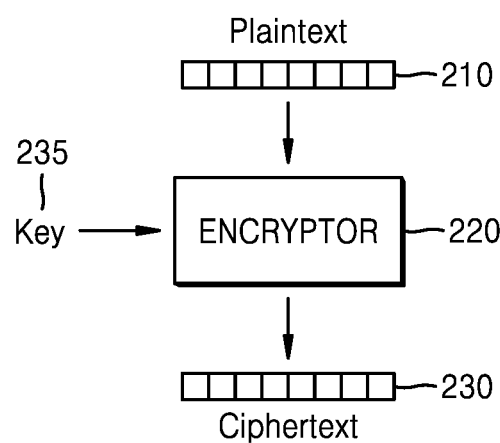
FIG. 2 is a diagram for explaining a data encryption operation performed by the electronic apparatus of FIG. 1.

Examples of an encryption method used to store encrypted data in RAM include a direct encryption method and a method using a data cache structure. In FIGS. 1 and 2, RAM is illustrated as a memory device for writing data to, encrypting the data, and reading the encrypted data from. Data encryption based on a direct encryption method will be described with reference to FIG. 1, and data encryption based on a method using a data cache structure will be described with reference to FIG. 2.

FIG. 1 is a block diagram of an electronic apparatus for writing encrypted data, according to an embodiment.

Referring to FIG. 1, an electronic apparatus 100 for encrypting data using a direct encryption technique includes a processor 110, an encryption/decryption device 120, and a RAM 130. In the direct encryption technique, when data is encrypted in units of blocks, only block data that is to be encrypted is independently encrypted and decrypted.

The processor 110 may receive data that is to be encrypted, and may control the received data to be encrypted and written to the RAM 130. In detail, the processor 110 may transmit the data to be stored in the RAM 130 to the encryption/decryption device 120.

In FIGS. 1 through 7, data that is not yet encrypted is expressed as plain data or a plaintext, and encrypted data is expressed as cipher data or a ciphertext.

The encryption/decryption device 120 encrypts the received data and transmits the encrypted data to the RAM 130, or decrypts data read from the RAM 130.

The encryption/decryption device 120 may include an encryptor 121 that encrypts the received data and transmits the encrypted data to the RAM 130, and a decryptor 122 that decrypts the data read from the RAM 130 and transmits the decrypted data to the processor 110.

The RAM 130 writes and stores the data encrypted by the encryptor 121. The RAM 130 is a volatile memory device capable of repeatedly writing data. In detail, the RAM 130 may write and read data in units of a certain unit, for example, a block, a bit having a certain size, or a frame having a certain size.

The embodiments of FIGS. 1 through 4 illustrate a case in which the RAM 130 writes and reads data in units of data blocks each having a size of 128 bits. In other words, the unit in which data is encrypted or decrypted at one time is block data having a size of 128 bits. However, the size of the data block is merely exemplary.

The electronic apparatus 100 of FIG. 1 may encrypt data by using an electronic code book (ECB) mode encryption method, which is a direct encryption technique, and the encryption according to the ECB mode encryption method will now be described in detail with reference to FIG. 2.

FIG. 2 is a diagram for explaining a data encryption operation performed by the electronic apparatus 100 of FIG. 1. An encryptor 220 of FIG. 2 is the same as the encryptor 121 of FIG. 1, and thus a detailed description thereof will be omitted.

In the ECB mode encryption method, a data block is independently encrypted without connection or correlation between other data blocks. In the ECB mode encryption method, only one data block included at an arbitrary location from among pieces of data at respective locations may be independently encrypted.

Referring to FIG. 2, the encryptor 220 receives a plaintext 210, which is a single data block, and encrypts the plaintext 210 by using a key 235 to thereby generate a ciphertext 230. The key 235 is a parameter value necessary for encryption.

In encryption based on the ECB mode encryption method, because encryption with respect to a data block is independently conducted without correlation between data blocks, the data block may be decrypted by reading only the encrypted data block. Accordingly, a small number of data blocks need to be read for decryption, and thus the performance of access to the RAM 130 may be kept high. However, in encryption based on the ECB mode encryption method, the same encryption value is always generated for the same input value. Thus, the encryption is relatively weak.

Figure 3:
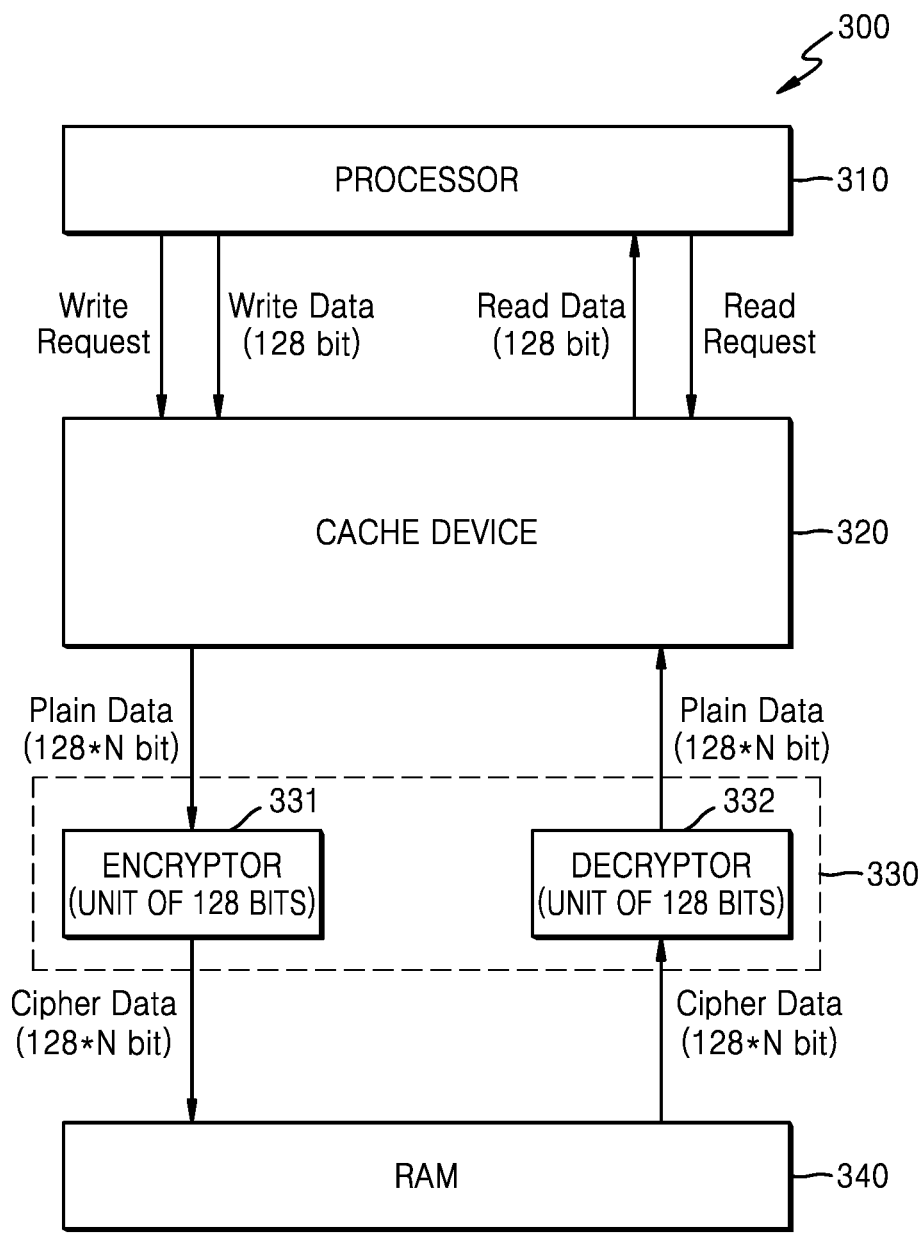
FIG. 3 is a block diagram of an electronic apparatus for writing encrypted data.

FIG. 3 is a block diagram of an electronic apparatus for writing encrypted data.

Referring to FIG. 3, an electronic apparatus 300 for encrypting data by using a block encryption technique based on a chain method includes a processor 310, a cache device 320, an encryption/decryption unit 330, and a RAM 340.

In the block encryption technique based on a chain method, a previous data block, which is already encrypted, affects encryption and decryption of a current data block that is to be encrypted. In the block encryption technique based on a chain method, different encryption values are generated for the same input value according to data values of data blocks near the current data block. Accordingly, a high security level may be maintained.

Examples of the block encryption technique based on a chain method include a cipher feedback (CFB) mode encryption method and an output feedback (OFB) mode encryption method. The CFB mode encryption method will be described later in detail with reference to FIG. 4.

Referring to FIG. 3, the processor 310 may receive write data, which is data to be encrypted and written to RAM 340, and may control the received write data to be encrypted and written to the RAM 340. In detail, the processor 310 may receive write data and a write request, and, in response to the write request, may transmit the received write data to the encryption/decryption unit 330.

The cache device 320 includes a cache memory, and may generate a parameter, for example, a key, necessary for encryption or decryption, and store the generated parameter in the cache memory. The cache device 320 supplies the key stored in the cache memory to the encryption/decryption unit 330. The cache device 320 transmits the write data received by the processor 310 to the encryption/decryption unit 330. The write data transmitted by the cache device 320 to the encryption/decryption unit 330 is data that is not yet encrypted, and thus is illustrated as plain data.

The block encryption technique based on a chain method is used in encrypting the values of data blocks adjacent to a current data block. Accordingly, when one data block has a size of 128 bits, because the values of the data blocks adjacent to the current data block also need to be used to encrypt the current data block, the cache device 320 transmits plain data (128*N bits) having 128*N bits, which are the current data block and one or more adjacent data blocks, to the encryption/decryption unit 330.

The encryption/decryption unit 330 encrypts the current data block by using the key received from the cache device 320 and the data value of a data block adjacent to the current data block, which is to be encrypted. The encryption/decryption unit 330 transmits encrypted data to the RAM 340, or decrypts data read from the RAM 340.

The encryption/decryption unit 330 may include an encryptor 331 that encrypts the received data and transmits the encrypted data to the RAM 340, and a decryptor 332 that decrypts the data read from the RAM 340 and transmits the decrypted data to the processor 310.

The RAM 340 writes and stores the data encrypted by the encryptor 331.

Figure 4:
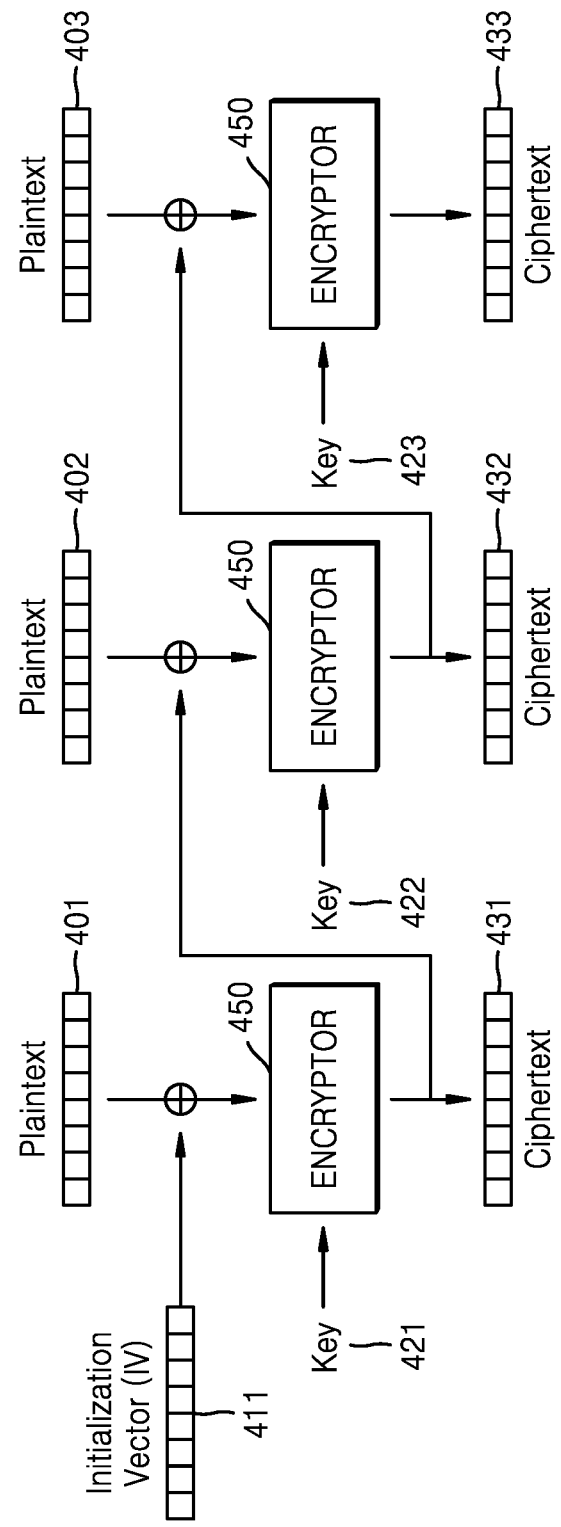
FIG. 4 is a diagram for explaining a data encryption operation performed by the electronic apparatus of FIG. 3.

FIG. 4 is a diagram for explaining a data encryption operation performed by the electronic apparatus 300 of FIG. 3. In detail, FIG. 4 is a diagram for explaining a data encryption operation based on the CFB mode encryption method. An encryptor 450 of FIG. 4 is the same as the encryptor 331 of FIG. 3, and thus a detailed description thereof will be omitted.

Referring to FIG. 4, an operation of encrypting a first data block 401, a second data block 402, and a third data block 403, when the RAM 340 stores a plurality of pieces of block data adjacent to each other, is illustrated. Because the first data block 401, the second data block 402, and the third data block 403 are all pieces of data that are not yet encrypted, the first data block 401, the second data block 402, and the third data block 403 are plaintexts.

Because no data blocks are adjacent to a front end of the first data block 401, the encryptor 450 sums an initialization vector (IV) 411 and the first data block 401, which is to be encrypted, and encrypts a data value corresponding to a result of the summation by using a key 421 to thereby generate a ciphertext 431, which is encrypted data. The encrypted data 431 is then stored in RAM.

When the second data block 402 is to be encrypted, the encryptor 450 sums the ciphertext 431, which is an encryption value corresponding to the first data block 401 adjacent to a front end of the second data block 402, which is to be encrypted, and the second data block 402, and encrypts a data value corresponding to a result of the summation by using a key 422 to thereby generate a ciphertext 432, which is encrypted data. The encrypted data 432 is then stored in RAM.

Iteratively, the encryptor 450 sums the ciphertext 432, which is an encryption value corresponding to the second data block 402 adjacent to a front end of the third data block 403, which is to be encrypted, and the third data block 403, and encrypts a data value corresponding to a result of the summation by using a key 423 to thereby generate a ciphertext 433, which is encrypted data. The encrypted data 433 is then stored in RAM.

The block encryption technique based on a chain method, such as the ECB mode encryption method, has a structure in which a previous data block affects encryption, and thus decryption, of a current data block. For example, the ciphertext 431 and the ciphertext 432 respectively corresponding to the first data block 401 and the second data block 402, which are all data blocks existing at the front end of the third data block 403, are used to encrypt the third data block 403. In other words, because all of the values of the first, second, and third data blocks 401, 402, and 403 need to be known to encrypt the third data block 403, a data value of 128*3 bits is needed.

Accordingly, access to data of a maximum of 128*N bits is needed to encrypt one of N data blocks, for example, a data block having a size of 128 bits, and thus access performance is degraded when employing the block encryption technique based on a chain method. Moreover, because access to encrypted data of a maximum of 128*N bits is needed to decrypt encrypted block data, access performance is degraded.

Accordingly, to perform an encryption operation according to the block encryption technique based on a chain method, the cache device 320 may be designed by using a large storage resource, such as a large-capacity on-chip memory.

In other words, the block encryption technique based on a chain method may increase security of data stored in memory, but degrades access performance and necessitates a large storage resource.

As described above, the direct encryption method, such as the ECB mode encryption method described above with reference to FIGS. 1 and 2, may maintain high access performance but is weaker with respect to security. The method using a data cache structure, such as the block encryption technique based on a chain method described above with reference to FIGS. 3 and 4, may maintain a high security level, but access performance is degraded and a large storage resource may be required.

A data encryption method according to an embodiment capable of maintaining a high security level while avoiding the need for a large storage resource and maintaining adequate access performance, and an electronic apparatus performing the data encryption method will now be described in detail with reference to FIGS. 5 through 14.

Figure 5:
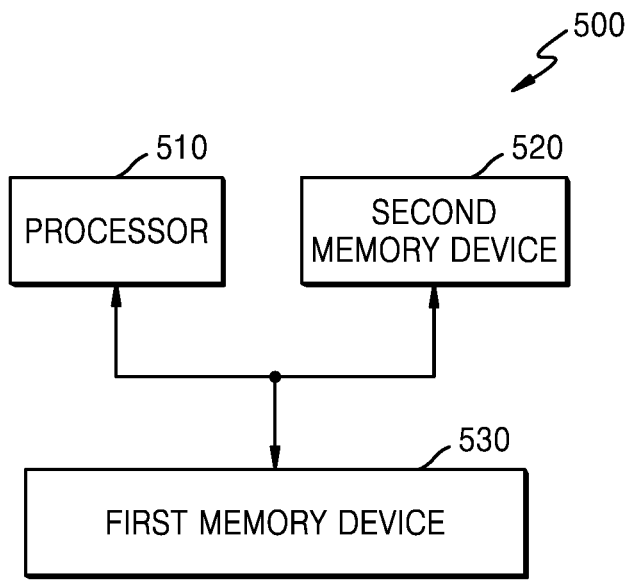
FIG. 5 is a block diagram of an electronic apparatus according to an embodiment.

FIG. 5 is a block diagram of an electronic apparatus according to an embodiment.

The electronic apparatus according to an embodiment may be any apparatus capable of encrypting input data and writing and storing encrypted data in a memory device.

In detail, the electronic apparatus according to an embodiment may include any apparatus capable of performing at least one of a write operation, a re-write operation, a delete operation, and a read operation with respect to encrypted data by randomly accessing a storage area of an internally included memory device, for example, a first memory device 530 of FIG. 5. Examples of the electronic apparatus may include a display device (such as, a TV), a computer, a smartphone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, and a wearable device.

Referring to FIG. 5, an electronic apparatus 500 includes a processor 510, a first memory device 530, and a second memory device 520.

The processor 510 may control write and read operations of the electronic apparatus 500.

When data is encrypted and written to the first memory device 530, the second memory device 520 updates encryption information including address information indicating a write location at which the encrypted data is stored on the first memory device 530 and a parameter for use in encryption. And, the second memory device 520 stores the updated encryption information. The parameter for use in encryption may be referred to as an encryption parameter.

The first memory device 530 may include any memory device capable of storing encrypted data and performing at least one of a write operation, a re-write operation, a delete operation, and a read operation with respect to encrypted data by accessing an internally included storage area.

For example, the first memory device 530 may include RAM.

The second memory device 520 may include any memory device that stores encryption information, which is information related to the encrypted data. In detail, the second memory device 520 may include any memory device capable of writing and storing, correcting, adding, deleting, or reading the encryption information by accessing any storage area of the second memory device 520. The second memory device 520 may search for or update encryption information stored in the storage area of the second memory device 520.

For example, the first memory device 530 may include a cache device including a cache memory. The cache memory may include a static RAM (SRAM) capable of writing, rewriting, deleting, or reading data via random access to an internally included storage area thereof and operating at high speed.

In detail, in response to a write request for encrypting data and writing the encrypted data to the first memory device 530, the second memory device 520 may change at least one of the address information and the parameter, and may update the encryption information, based on the change.

The processor 510 controls the encrypted data to be written to the first memory device 530, based on the encryption information.

The first memory device 530 writes and stores the encrypted data. In detail, the first memory device 530 may include RAM, which is a volatile memory device. The first memory device 530 may write and read data in units of a certain unit by accessing the internally included storage area. The first memory device 530 may re-write data in units of a certain unit by accessing the internally included storage area. The certain unit may be a unit, such as a block, a bit having a certain size, or a frame having a certain size.

Hereinafter, RAM will be illustrated as the first memory device 530 and described. A case in which the first memory device 530 performs write and read operations in units of a data block having a certain size will now be illustrated and described. Accordingly, data input to the processor 510, encrypted, and written to and stored in the first memory device 530 will now be referred to as block data.

The electronic apparatus 500 may re-write data by accessing at least a portion of a data block stored in the first memory device 530.

According to the disclosure, data received by the processor 510, which is not yet encrypted, may have the same size as data stored in the first memory device 530, which has been encrypted. In detail, encrypted block data and decrypted block data may each have, for example, 128 bits or 256 bits.

The first memory device 530 and the second memory device 520 may be implemented as independent memory devices.

The first memory device 530 and the second memory device 520 may be incorporated into a single memory device. For example, the first memory device 530 and the second memory device 520 may be implemented as a single integrated memory device, such as RAM, and thus the first memory device 530 may constitute one portion of the single memory device and the second memory device 520 may constitute the other portion thereof.

A cache device including a cache memory will now be illustrated as the second memory device 520 and described.

Electronic apparatuses according to embodiments will now be described in detail with reference to FIGS. 6 and 7.

Figure 6:
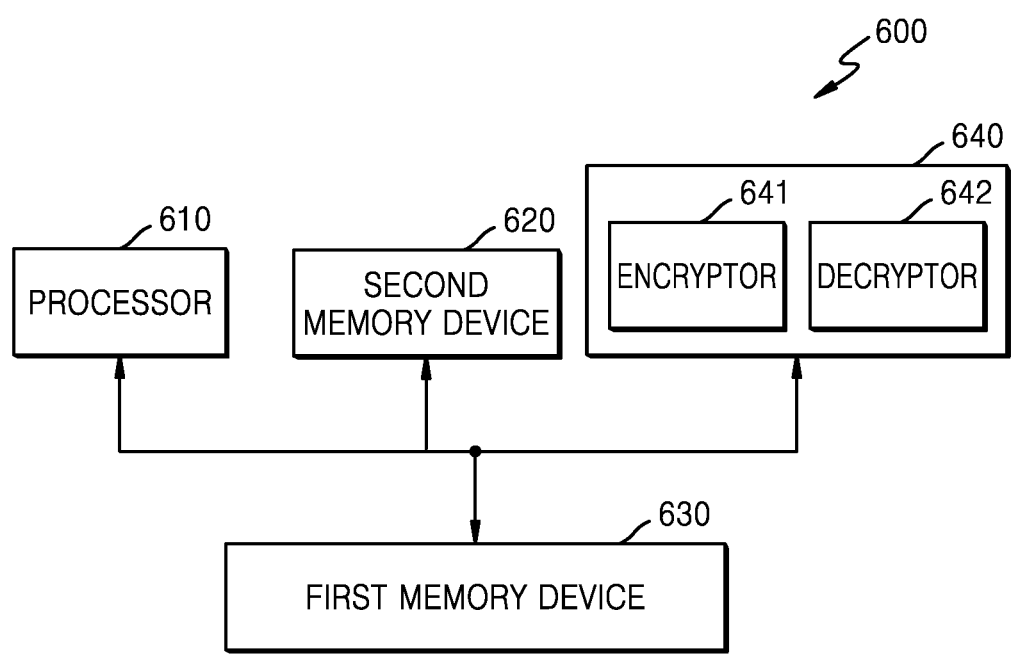
FIG. 6 is a block diagram of an electronic apparatus according to an embodiment.

FIG. 6 is a block diagram of an electronic apparatus according to another embodiment.

Referring to FIG. 6, an electronic apparatus 600 may further include an encryption/decryption unit 640, compared with the electronic apparatus 500 of FIG. 5. A processor 610, a second memory device 620, and a first memory device 630 included in the electronic apparatus 600 are respectively the same as the processor 510, the second memory device 520, and the first memory device 530 included in the electronic apparatus 500, and thus detailed descriptions thereof will be omitted.

The encryption/decryption unit 640 encrypts input data and transmits the encrypted data to the first memory device 630, or decrypts data read from the first memory device 630, under the control of the processor 610.

In detail, the encryption/decryption unit 640 may include an encryptor 641 and a decryptor 642.

The encryptor 641 may receive the input data from the processor 610, and may encrypt the input data, based on encryption information stored in the second memory device 620.

The decryptor 642 may read data corresponding to a read request from among pieces of data stored in the first memory device 630, and decrypt the read data, based on the encryption information stored in the second memory device 620.

Encryption and decryption operations of an electronic apparatus according to an embodiment will now be described in detail with reference to FIGS. 7 through 13.

Figure 7:
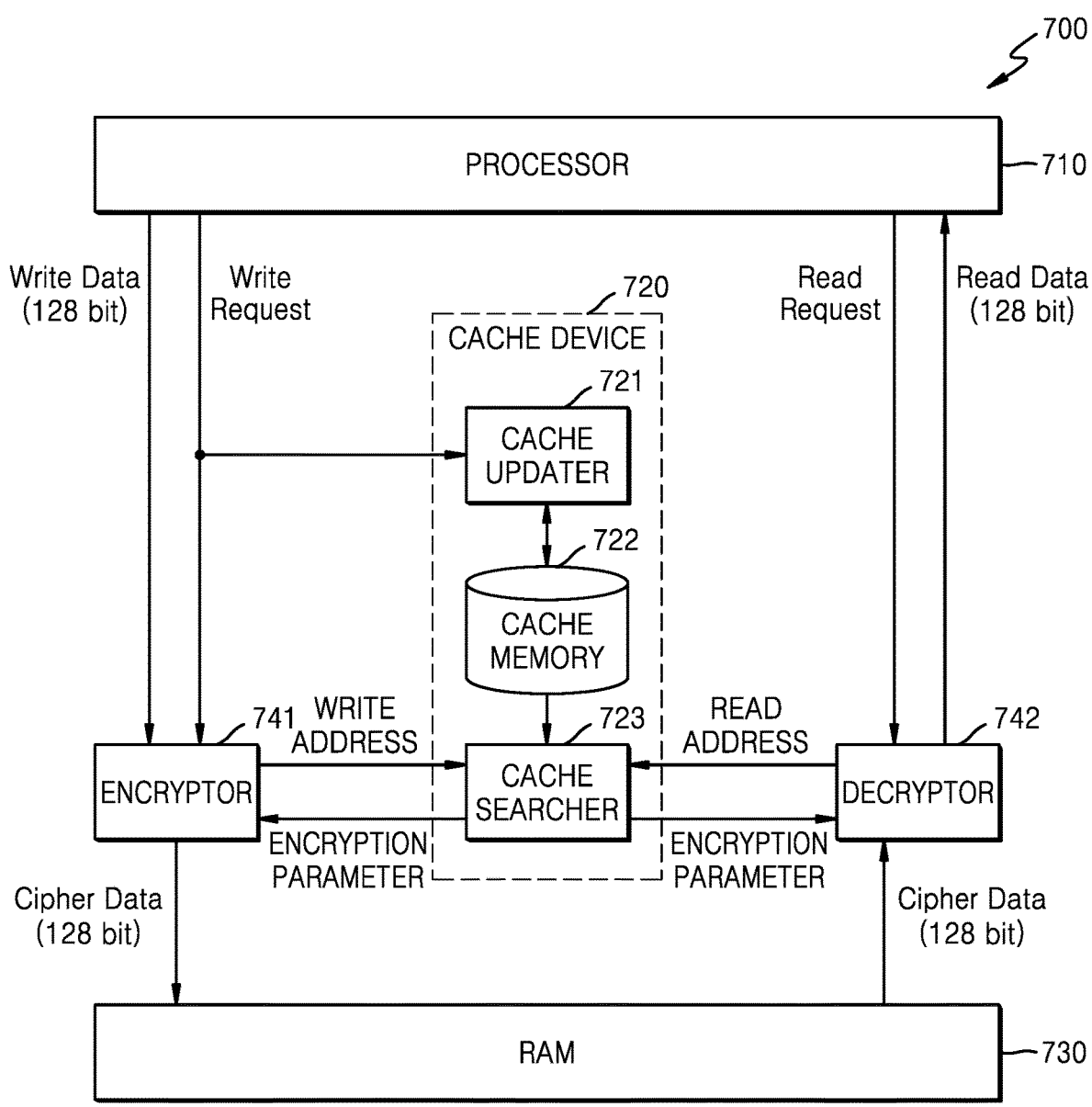
FIG. 7 is a block diagram of an electronic apparatus according to an embodiment.

FIG. 7 is a block diagram of an electronic apparatus according to an embodiment.

A processor 710, a second memory device 720, a first memory device 730 (e.g., RAM), an encryptor 741, and a decryptor 742 included in an electronic apparatus 700 are respectively the same as the processor 610, the second memory device 620, the first memory device 630, the encryptor 641, and the decryptor 642 included in the electronic apparatus 600 of FIG. 6, and thus detailed descriptions thereof will be omitted.

In the embodiment of FIG. 1, the first memory device 730 is implemented as RAM 730, and the second memory device 720 is implemented as a cache device 720.

The RAM 730 may be a memory device capable of performing at least one of a write operation, a re-write operation, a delete operation, and a read operation with respect to data by randomly accessing an internally included storage area. The data written to the RAM 730 may be encrypted data. In detail, the RAM 730 may store data encrypted under the control of the processor 710.

The cache device 720 is a memory device including a cache memory 722, and may be a memory device capable of performing at least one of a write operation, a re-write operation, a delete operation, and a read operation with respect to encryption information by accessing a storage area of the cache memory 722. The cache memory 722 is a memory that operates at high speed, and thus the cache device 720 may quickly update or search for encryption information stored in the cache memory 722.

The processor 710 may control write and read operations of the electronic apparatus 700. Data that is input to the processor 710 and is to be encrypted will be referred to as write data. The write data is data that is not yet encrypted, and thus has a form of the above-described plain data or plaintext. A write request is a signal that requests certain data to be encrypted and written to a certain location on the RAM 730. The write request may include a write address indicating a location on the RAM 730 to which data is to be written.

In detail, the processor 710 may transmit the write data to the encryptor 741 and may transmit the received write request to the encryptor 741 and the cache device 720.

When data is encrypted and written to the RAM 730, the cache device 720 updates encryption information including address information indicating a write location on the RAM 730 and a parameter for use in encryption, and stores the updated encryption information.

In detail, in response to a write request for encrypting data and writing the encrypted data to the RAM 730, the cache device 720 may change at least one of the address information and the parameter included in the encryption information, and may update the encryption information, based on the change. The cache device 720 updates the encryption information when receiving the write request means updating the encryption information in correspondence to reception of the write request. Thus, when the cache device 720 receives the write request, the cache device 720 may immediately update the encryption information. Alternatively, when the write request is received and thus write data is encrypted, or after encryption is completed, the encryption information may be updated.

In detail, the cache device 720 may receive the write request, and may update the encryption information stored in the cache device 720, based on write address information included in the write request.

In detail, the electronic apparatus 700 according to an embodiment may update encryption information every time the write request is received, thereby generating different pieces of encryption information according to a write request time period or a write time period. Encryption information includes address information and a parameter, and thus, when at least one of the address information and the parameter is changed, the encryption information is changed. When at least one of the address information and the parameter is changed to another value, the encryption information is changed, and, when the encryption information is changed, even when an input value is the same, an encryption value corresponding to the input value is changed.

According to an embodiment, the cache device 720 may include a cache updater 721, the cache memory 722, and a cache searcher 723.

The cache memory 722 stores the encryption information.

In detail, when data is written to the RAM 730 in units of blocks, the cache memory 722 may store data blocks, which are to be written to the RAM 730, or encryption information corresponding to each data block on the RAM 730.

The cache updater 721 may update encryption information already stored in the cache memory 722 to thereby generate updated encryption information. When encryption information corresponding to the write request does not exist in the cache memory 722 for example, when a block area on the RAM 730 is initially designated as a write area or data is initially written to the block area on the RAM 730, the cache updater 721 may generate encryption information corresponding to designation of a write area on the RAM 730 or an write request corresponding to data to be initially written in the RAM 730.

In detail, the cache updater 721 may update encryption information corresponding to the write request. The cache updater 721 may change at least one of address information and an encryption parameter included in encryption information stored in the cache memory 722, based on the write request, and update the encryption information, based on the change. The updating may be any instance in which existing encryption information stored in the cache memory 722 is changed, and thus may include not only a case in which at least one data value included in existing encryption information stored in the cache memory 722 is changed, but also a case in which new encryption information associated with existing encryption information stored in the cache memory 722 is established and a case in which existing encryption information stored in the cache memory 722 is deleted.

The cache memory 722 stores a write location on the RAM 730 to which data is encrypted and written, and a parameter for use in encryption and decryption. Accordingly, the encryptor 741 may encrypt data or decrypt read from the RAM 730, based on the encryption information stored in the cache memory 722, and avoid the calculation of the encryption (decryption) parameter.

When the cache device 720 receives a write request or a read request, the cache searcher 723 may search for encryption information corresponding to the write request or read request. In detail, in response to a write request, the cache searcher 723 may search for encryption information corresponding to the write request and may perform encryption or update encryption information by using retrieved encryption information. In response to a read request, the cache searcher 723 may search for encryption information corresponding to the read request and may perform decryption by using retrieved encryption information. Accordingly, in response to the read request, the cache device 720 may search for a write location of data and a parameter for use in decryption corresponding to the read request such that data written to the RAM 730 may be read and decrypted.

As described above, because the cache device 720 updates encryption information in correspondence with a write request, the electronic apparatus 700 according to an embodiment may generate different pieces of encryption information according to at least one of a time period during which data is written to the RAM 730 and a write location on the RAM 730.

In detail, the cache device 720 may generate encryption information that is applied when first data is written to the RAM 730 at a first time point, and encryption information that is applied when the first data is written to the RAM 730 at a second time point different from the first time point, such that the two pieces of encryption information are different from each other. When the same data is encrypted and there are different pieces of encryption information, the value of encrypted data varies.

Accordingly, when the same first data is encrypted, cipher data encrypted and written to the RAM 730 at the first time point and cipher data encrypted and written to the RAM 730 at the second time point may have different values.

The following terms may be employed as follows.

Dynamic Address Range (DAR) cache: a cache memory that stores an address area value that dynamically changes. The address area value dynamically changes based on the value of an address at which encrypted data is written, which is included in a write request.

start address (SA): address information indicating a start address of certain data stored in a storage space, for example, the RAM 730, within the electronic apparatus 700.

end address (EA): address information indicating an end address of certain data stored in the storage space, for example, the RAM 730, within the electronic apparatus 700.

write start address (WSA): address information indicating a start location on a write area on the RAM 730 when certain data is requested to be written to the RAM 730.

write end address (WEA): address information indicating an end location on the write area on the RAM 730 when certain data is requested to be written to the RAM 730.

According to an embodiment, the cache device 720 may have a configuration of a DAR cache. In detail, the cache memory 722 of the cache device 720 may store encryption information including an address area value that dynamically changes (being dynamically updated) in correspondence with a write request.

In response to a write request for certain data, encryption information may be generated, including address information indicating a write location of data to be written to the RAM 730, for example, data encrypted using a certain parameter, and the certain parameter.

In detail, the address information may include a start location of data on the RAM 730, an end location of data on the RAM 730, and information indicating a size or length of a data block on the RAM 730. When the RAM 730 writes and stores data, the RAM 730 may be split or partitioned into a plurality of memory areas or partitions and may write the data to the plurality of memory areas. The address information may include information indicating a location of a memory area on the RAM 730 to which data is written, for example, a block area. For example, the address information may include at least two of a start address, an end address, and size information of an area ranging from the start address to the end address.

Parameters included in the encryption information are encryption parameters for use in encrypting data. In detail, the encryption parameters may be all values that may affect a result of encrypting input data. For example, the parameters may include one or more of a key value, an IV, an arithmetic parameter, a table parameter, and an encryption technique selection value. The parameters may have values that continuously change over time, such as a time stamp or a random value, to increase a security level of encrypted data.

Figure 8A:
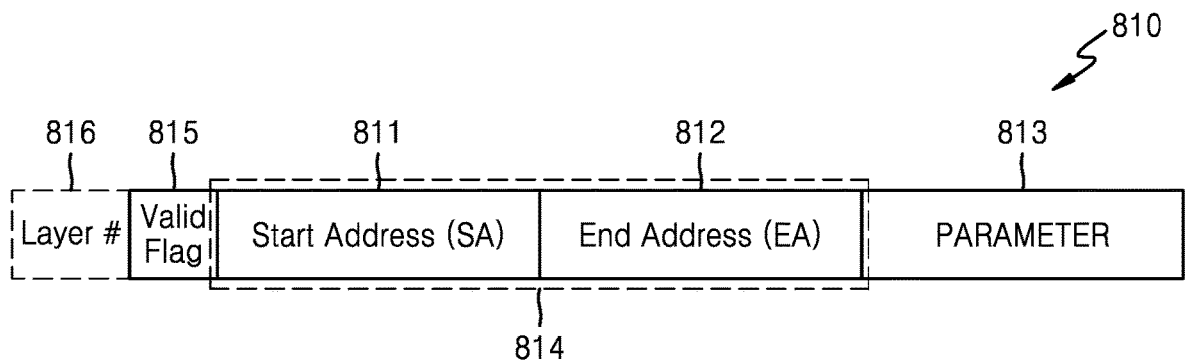
FIGS. 8A through 8C are diagrams illustrating encryption information, according to an embodiment.
Figure 8B:
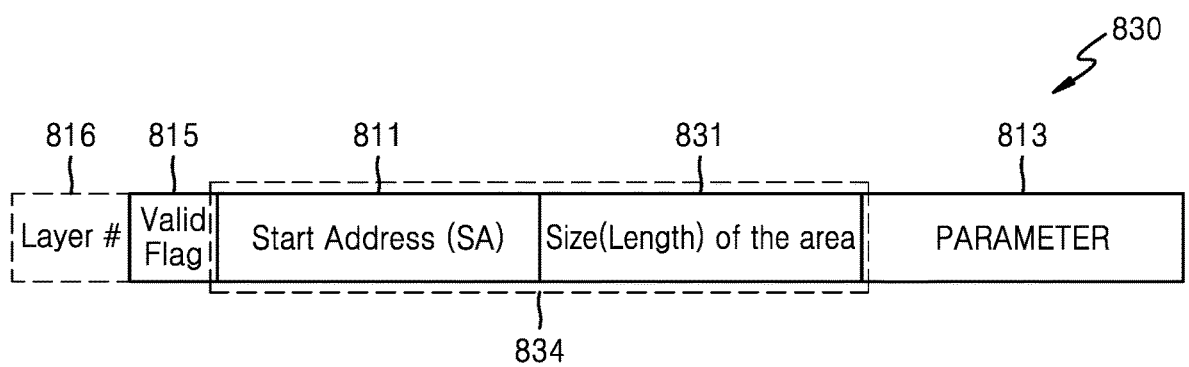
Figure 8C:
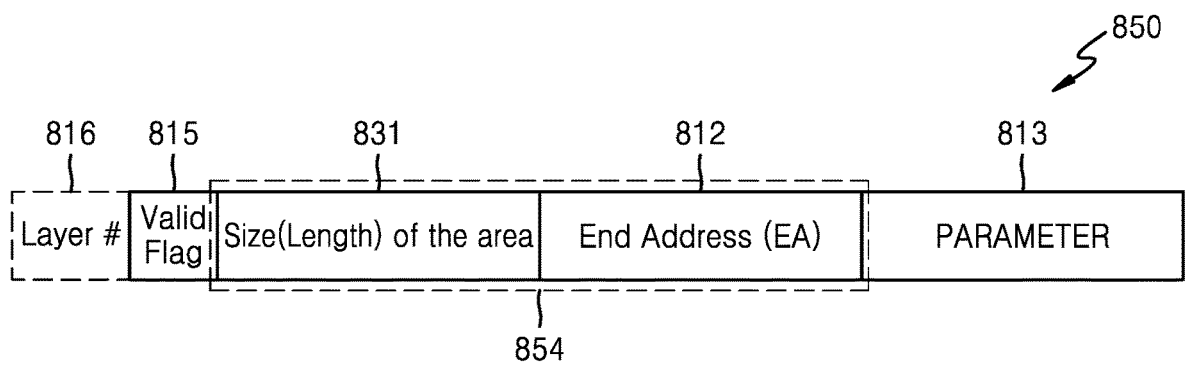

The encryption information stored in the cache memory 722 will be described in more detail with reference to FIGS. 8A through 8C. FIGS. 8A through 8C are diagrams illustrating encryption information that is used in an embodiment. As shown in FIGS. 8A through 8C, address information may have various formats. In FIGS. 8A through 8C, like elements use like reference numerals.

Referring to FIG. 8A, encryption information 810 includes address information 814 and a parameter 813. The address information 814 may include a start address (SA) 811 and an end address (EA) 812. In detail, when the RAM 730 distinguishes and stores data in units of blocks, the start address 811 may include information indicating a start location of a block at which data is stored. The end address 812 may include information indicating an end location of the block at which data is stored.

The encryption information 810 may further include a valid flag 815, which is information indicating that encryption information exists validly. The cache device 720 may easily determine whether the encryption information 810 corresponding to a write request exists, based on the valid flag 815.

The cache memory 722 may include storage areas having a structure of a plurality of layers. The cache memory 722 may store the encryption information 810 in an area corresponding to one layer included in the multi-layer structure.

The encryption information 810 may further include layer information (Layer #) 816 indicating a correspondence between a layer within the cache memory 722 and an area in which the encryption information 810 is stored. The cache device 720 may easily determine a storage location of the encryption information 810 from among the plurality of layers included in the cache memory 722, based on the layer information 816.

Referring to FIG. 8B, address information 834 included in encryption information 830 may include the start address 811 and size information 831. The size information 831 may include information indicating a size of a storage area of data stored on the RAM 730, for example, a data block area. In detail, the size information 831 may include information indicating a size between a start address of a data block and an end address thereof. Alternatively, the size information 831 may include information indicating a length between the start address of the data block to the end address thereof.

The other elements included in the encryption information 830 are the same as those described above with reference to FIG. 8A, and thus descriptions thereof will be omitted.

Referring to FIG. 8C, address information 854 included in encryption information 850 may include the size information 831 and the end address 812. The like elements included in the encryption information 850 are the same as those described above with reference to FIGS. 8A and 8B, and thus descriptions thereof will be omitted.

Figure 9:
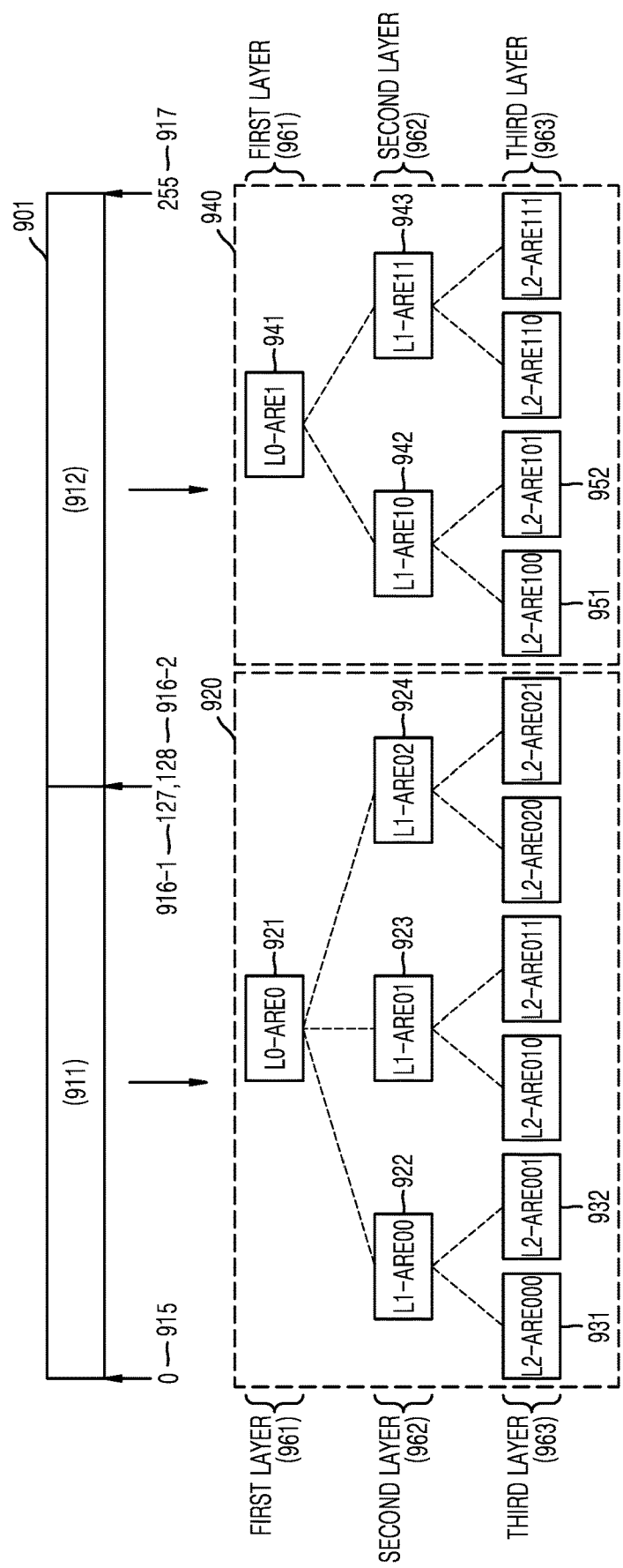
FIG. 9 is a diagram illustrating a layer structure of a cache memory, according to an embodiment.

FIG. 9 is a diagram illustrating a layer structure of a cache memory, according to an embodiment.

Referring to FIG. 9, the cache memory 722 has a structure of a plurality of layers (L0, L1, L2, . . . , Ln). In detail, the cache memory 722 may store encryption information in a certain area included in a storage area having a structure of a plurality of layers.

Referring to FIG. 9, a storage area 901 included in the RAM 730 is illustrated. In detail, the RAM 730 writes data in units of blocks, and, in FIG. 9, first block data and second block data may be written to a first block 911 and a second block 912, respectively, which are two block areas included in the RAM 730.

Referring to FIG. 9, the electronic apparatus 700 may write the first block data to the first block 911 included in the storage area 910 of the RAM 730, and write the second block data to the second block 912 included in the storage area 910. In detail, the first block data represents data that is obtained by encrypting the first data received by the processor 710 and is written to and stored on the RAM 730, and the second block data represents data that is obtained by encrypting the second data received by the processor 710 and is written to and stored on the RAM 730.

FIG. 9 illustrates a case in which each of the first data, the second data, the first block data, and the second block data has a size of 128 bits. FIG. 9 also illustrates a case in which an area on the RAM 730 to which the first block data is written, for example, the first block 911, has a start address 915 of 0 and an end address 916-1 of 127, and an area on the RAM 730 to which the second block data is written, for example, the second block 912, has a start address 916-2 of 128 and an end address 917 of 255.

The cache device 720 may generate and store first encryption information corresponding to the first block data. The cache device 720 may generate and store second encryption information corresponding to the second block data. The cache device 720 may initially generate encryption information 920. Previously-generated encryption information may be updated by correcting or adding at least a portion of the previously-generated encryption information.

For convenience of explanation, data initially written to and stored in a certain block area on the RAM 730 will be referred to as initial data. When data is previously written to a certain block area on the RAM 730 and certain data is re-written to the area to which data has already been written, the re-written data is referred to as update data. The update data may be written to a portion of a block area to which initial data has been written, or may be written to the entire block area to which initial data has been written.

In detail, when the RAM 730 divides a storage area into a plurality of blocks and writes and stores a plurality of pieces of block data, the cache device 720 may generate and store encryption information in correspondence with each of the plurality of blocks.

Referring to FIG. 9, the cache memory 722 may include an area that stores encryption information 920 corresponding to block data that is written to the first area 911 of the RAM 730, and an area that stores encryption information 920 corresponding to block data that is written to the second area 912 of the RAM 730.

The cache memory 722 may include storage areas having a structure of a plurality of layers.

FIG. 9 illustrates a case in which the cache memory 722 includes a storage area including a first layer 961, a second layer 962, and a third layer 963, for the area that stores encryption information 920 corresponding to block data that is written to the first area 911 of the RAM 730. The first layer 961 is an uppermost layer, the second layer 962 is a lower layer subordinate to the first layer 961, and the third layer 963 is subordinate to the second layer 962 and thus becomes a lowermost layer.

In detail, in the layer structure of the cache memory 722, a certain layer may be connected to at least one lower layer. In detail, a storage area corresponding to the first layer 961 may be connected to at least one storage area corresponding to the second layer 962, which is a lower layer of the first layer 961. A storage area corresponding to the second layer 962 may be connected to at least one storage area corresponding to the third layer 963, which is a lower layer of the second layer 962.

For example, a storage area (LO-ARE0) 921 corresponding to the first layer 961 may be connected to one or more storage areas (referred to as second layer storage areas) corresponding to the second layer 962, for example, a (first) second layer storage area (L1-ARE00) 922, a (second) second layer storage area (L1-ARE01) 923, and a (third) second layer storage area (L1-ARE02) 924, in a relationship between an upper layer and at least one lower layer associated with the upper layer. At least one storage area corresponding to the second layer 962, for example, the (first) second layer storage area (L1-ARE00) 922, may be connected to one or more storage areas (referred to as third layer storage areas) corresponding to the third layer 963, for example, a (first) third layer storage area (L2-ARE000) 931 and a (second) third layer storage area (L2-ARE001) 932, in a relationship between an upper layer and at least one lower layer associated with the upper layer.

As described above, the cache memory 722 may include an area that stores encryption information 940 corresponding block data that is written to the second area 912 of the RAM 730.

FIG. 9 illustrates a case in which the cache memory 722 includes a storage area including a first layer 961, a second layer 962, and a third layer 963, for the area that stores encryption information 920 corresponding to block data that is written to the second area 912 of the RAM 730. The first layer 961 is an uppermost layer, the second layer 962 is a lower layer subordinate to the first layer 961, and the third layer 963 is subordinate to the second layer 962 and thus becomes a lowermost layer.

Like the area that stores encryption information 920 corresponding to block data that is written to the first area 911 of the RAM 730, in the layer structure of the cache memory 722 for the area that stores encryption information 940 corresponding block data that is written to the second area 912 of the RAM 730, a certain layer may be connected to at least one lower layer. In detail, a storage area corresponding to the first layer 961 may be connected to at least one storage area corresponding to the second layer 962, which is a lower layer of the first layer 961. A storage area corresponding to the second layer 962 may be connected to at least one storage area corresponding to the third layer 963, which is a lower layer of the second layer 962.

For example, a storage area (LO-ARE1) 921 corresponding to the first layer 961 may be connected to one or more storage areas (referred to as second layer storage areas) corresponding to the second layer 962, for example, a (first) second layer storage area (L1-ARE10) 942 and a (second) second layer storage area (L1-ARE11) 943, in a relationship between an upper layer and at least one lower layer associated with the upper layer. At least one storage area corresponding to the second layer 962, for example, the (first) second layer storage area (L1-ARE10) 942, may be connected to one or more storage areas (referred to as third layer storage areas) corresponding to the third layer 963, for example, a (first) third layer storage area (L2-ARE100) 951 and a (second) third layer storage area (L2-ARE101) 952, in a relationship between an upper layer and at least one lower layer associated with the upper layer.

When update data is encrypted and written to RAM, the cache device 720 may update encryption information corresponding to a write-requested area on the RAM 730. For example, when the encryption information 920 corresponding to the first block data written to the first block 911 is stored in the cache memory 722 and subsequently a write request for requesting re-writing of certain data to the first block 911 is received, the cache updater 721 may update the encryption information 920 corresponding to the first block 911. Updating of encryption information will be described later in detail with reference to FIGS. 10 through 12.

Updating encryption information means enabling existing encryption information to have a different value than an existing information value, such as correcting or changing at least a portion of the encryption information, adding new information, or deleting at least a portion of existing information. In detail, updating encryption information may include (i) a case of newly generating encryption information on a lower layer associated with existing encryption information, (ii) a case of changing or correcting at least one of address information and an encryption parameter included in the existing encryption information, (iii) a case of changing or correcting at least one of address information and an encryption parameter included in other encryption information existing on the same layer as or an upper layer above a layer of the existing encryption information while changing or correcting at least one of the address information and the encryption parameter included in the existing encryption information, and (iv) a case of deleting other encryption information existing on at least one of the same layer, an upper layer, or a lower layer associated with the existing encryption information while changing or correcting at least one of the address information and the encryption parameter included in the existing encryption information.

Referring back to FIG. 7, the encryptor 741 may receive the write data and the write request from the processor 710, and may encrypt the write data, based on encryption information generated or updated in correspondence with the write request by the cache device 720, to thereby generate cipher data. In detail, the cache updater 721 may receive the write request and generate or update encryption information in response to the received write request. The cache memory 722 stores the generated encryption information. Then, the encryptor 741 encrypts the write data by using a parameter included in the encryption information generated by the cache updater 721, to thereby generate cipher data. Then, the RAM 730 may write and store the cipher data to and in an area on the RAM 730 that corresponds to the write request.

The processor 710 receives the read request and transmits the received read request to the decryptor 742. The decryptor 742 may transmit a read address corresponding to the received read request to the cache device 720. The read address includes an address of an area on the RAM 730 to which read-requested data has been written. The cache device 720, in detail, the cache searcher 723, may receive the read address and search for encryption information corresponding to block data written to an area on the RAM 730 that corresponds to the read address. The cache device 720, in detail, the cache searcher 723, may transmit a parameter included in found encryption information, for example, an encryption parameter, to the decryptor 742. The decryptor 742 may read cipher data, which is block data written to the RAM 730, based on the read address, and may decrypt the read block data by using the encryption parameter received from the cache searcher 723. The decryptor 742 may transmit the decrypted data as read data to the processor 710.

Generation and updating of encryption information performed by the cache device 720 included in the electronic apparatus 700 will now be described in detail with reference to FIGS. 10 through 12.

Figure 10:
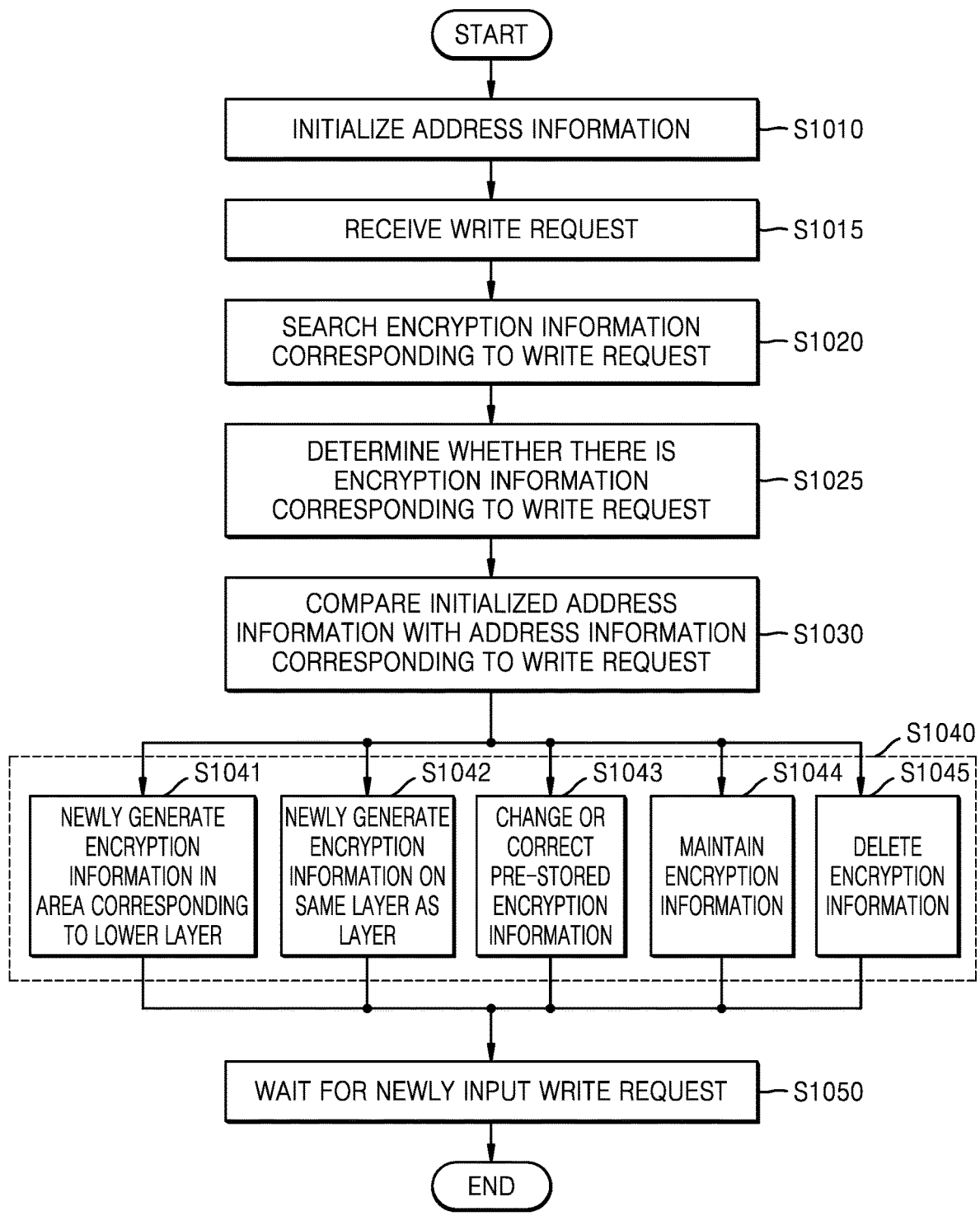
FIG. 10 is a flowchart of an operation of a cache device, according to an embodiment.

FIG. 10 is a flowchart of an operation of a cache device according to an embodiment.

Figure 11:
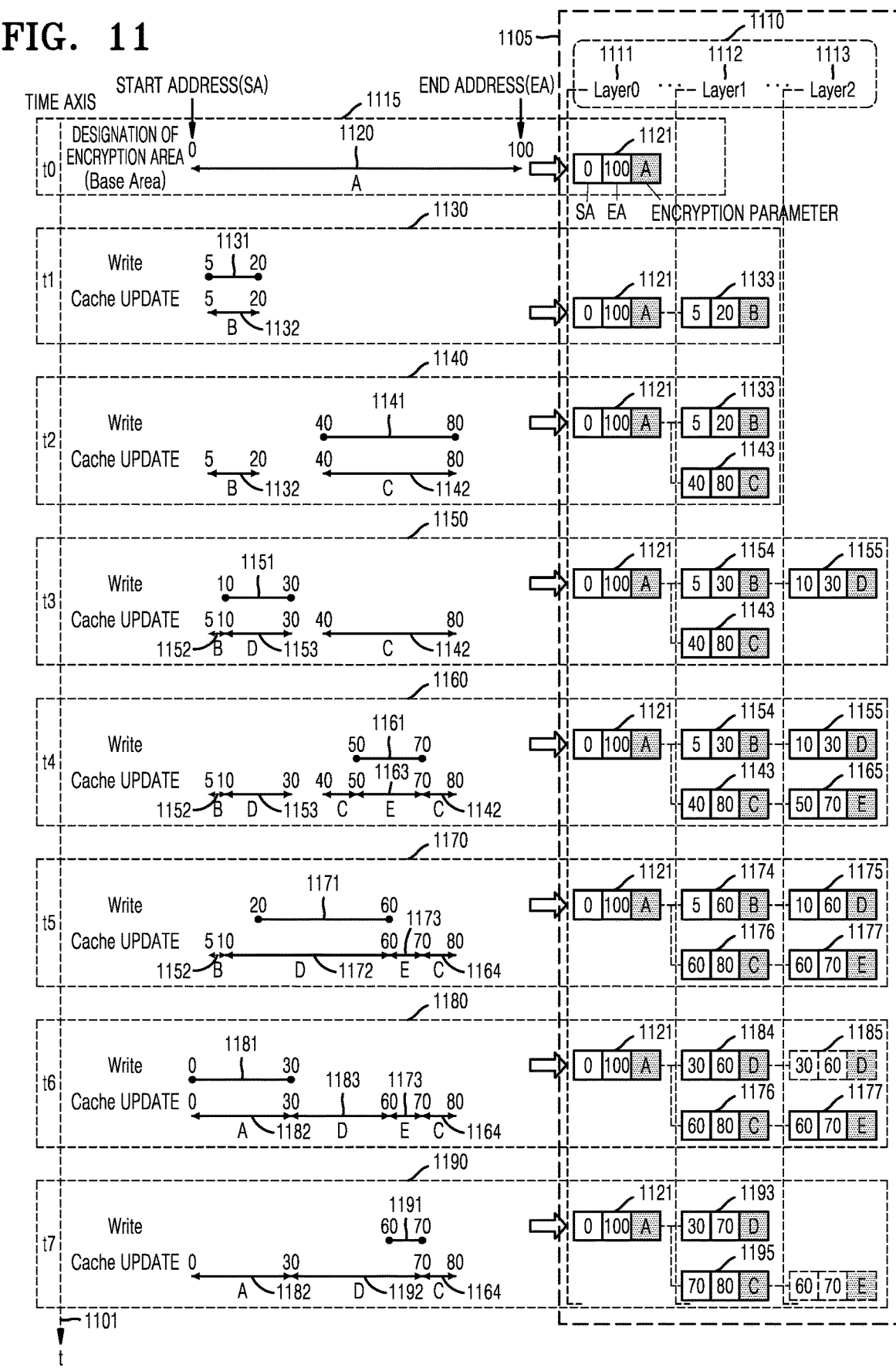
FIG. 11 is a diagram for explaining an encryption information updating operation of an electronic apparatus, according to an embodiment.

FIG. 11 is a diagram for explaining an encryption information updating operation of an electronic apparatus according to an embodiment.

A detailed operation performed by the cache device 720 when a write area is designated on the RAM 730 or initial data is written to a designated write area and then, at a subsequent time point, update data is written to and stored on the designated write area on the RAM 730, will now be described in detail with reference to FIGS. 10 and 11.

In operation S1010, the processor 710 may initialize address information. In operation S1010, the cache device 720 may generate encryption information including the initialized address information. In detail, in operation S1010, the processor 710 may set an area on the RAM 730 to which encrypted data is to be stored, based on setting of a user or a setting of the electronic apparatus 700. In other words, the processor 710 may designate an area on the RAM 730 to which encrypted data is to be stored, based on setting of a user or a setting of the electronic apparatus 700.

The processor 710 may initialize the address information such that the address information corresponds to the set area. For example, the processor 710 may designate an area on the RAM 730 having a start address SA of 0 and an end address EA of 100, based on user setting. Then, in correspondence with this setting, the cache device 720 may generate encryption information and store the generated encryption information in an area corresponding to an uppermost layer of the cache memory 722. When the processor 710 receives a write request with respect to initial data, the electronic apparatus 700 may encrypt the initial data and write the encrypted initial data to the designated area on the RAM 730, based on the generated encryption information.

Thereafter, in operation S1015, the processor 710 may receive a write request. The write request is a signal that requests certain data to be written to a certain area on the RAM 730. Accordingly, the write request may include information indicating the certain area on the RAM 730. The processor 710 may receive data that is to be written, together with the write request.

In operation S1020, the cache device 720 may search for encryption information corresponding to the write request. And, in operation 1025, the cache device 720 may determine whether there is encryption information corresponding to the write request.

In operation S1030, the cache device 720 may compare the initialized address information with address information corresponding to the write request.

Based on a result of the search operation S1020, the cache device 720 may determine whether there is encryption information corresponding to the write request.

In detail, the cache device 720 may receive the write request via the processor 710, and may search for encryption information in operation S1020, based on information about an area on the RAM 730 to which data included in the received write request is to be written.

For example, the write request may include information indicating an area to which certain data is to be written, and the information indicating an area to which certain data is to be written may include a write start address (WSA) and a write end address (WEA). The cache device 720 may compare a start address (SA) and an end address (EA) of the initialized address information with the write start address (WSA) and the write end address (WEA) and may determine, based on a result of the comparison, whether there exists encryption information corresponding to the write request. For example, when an area on the RAM 730 designated by the start address SA and the end address EA of the initialized address information includes an area on the RAM 730 designated by the write start address (WSA) and the write end address (WEA), the cache device 720 may determine that there is encryption information corresponding to the write request.

In operation S1040, when the cache device 720 determines that there is encryption information corresponding to the write request, the cache device 720 may update the encryption information, based on a result of the comparison between the initialized address information and the address information corresponding to the write request.

The encryption information may be updated in various ways.

In detail, in operation S1041, the cache device 720 may newly generate encryption information in an area corresponding to a lower layer subordinate to encryption information already generated and stored in the cache memory 722. As described in block 1130 of FIG. 11, the cache device

720 may newly generate encryption information 1133 in an area corresponding to a lower layer subordinate to pre-stored encryption information 1121.

In operation S1042, the cache device 720 may newly generate encryption information on the same layer as a layer corresponding to the pre-stored encryption information. As described in block 1140 of FIG. 11, the cache device 720 may newly generate encryption information 1133 on the same layer as the layer corresponding to the pre-stored encryption information 1133, for example, on a second layer 1112.

In operation S1043, the cache device 720 may update the pre-stored encryption information by changing or correcting at least one of location information and an encryption parameter included in the pre-stored encryption information. As described in blocks 1160 and 1170 of FIG. 11, the cache device 720 may generate updated encryption information 1175 by changing an end address EA of encryption information 1155 from 30 to 60.

In operation S1044, the cache device 720 may maintain the encryption information. In detail, when no encryption information corresponding to the received write request exists, the pre-stored encryption information may be maintained without changes.

In operation S1045, the cache device 720 may update encryption information by deleting the encryption information stored in the cache memory 722. As described in block 1180 of FIG. 11, the cache device 720 may update encryption information by reflecting a write request received at a time point t6, by deleting encryption information 1185 stored on a lower layer of encryption information 1184 stored on the second layer 1112.

Although not shown in FIG. 10, the cache device 720 may store the updated encryption information.

When the updating of encryption information is completed, the cache device 720 may wait for a newly input write request, in operation S1050.

For example, by referring to FIG. 9, the processor 710 may designate the first block 911 included in the RAM 730, as an area to which encrypted data is to be written. The cache device 720 may generate encryption information corresponding to the designated area. In detail, the cache device 720 may generate encryption information including initialized address information including the start address SA and the end address EA corresponding to the first block 911 and an encryption parameter that is applied to cipher data to be written to the first block 911.

The cache device 720 may store the encryption information including the initialized address information in the storage area (LO-ARE0) 921 corresponding to the first layer 961, which is an uppermost layer from among the plurality of layers that form the cache memory 722.

Updating of encryption information will be described below in more detail with reference to FIG. 11.

Referring to a time (t) axis 1101 of FIG. 11, pieces of data written to the RAM 730 or updated over time and encryption information 1105 generated in correspondence with writing or updating of the pieces of data are illustrated.

FIG. 11 illustrates a case in which location information of an area on the RAM 730 to which encrypted data is written includes a start address SA and an end address EA as shown in the encryption information 1121. In other words, the encryption information 1121 of FIG. 11 may have the same structure as the encryption information 810 described above with reference to FIG. 8A.

For convenience of explanation, FIG. 11 illustrates a case in which location information, for example, an address value, of a data block that is written to the RAM 730 is expressed using integers ranging from 0 to 100.

FIG. 11 illustrates and describes an operation performed by the electronic apparatus 700 when data is to be written onto a block area 1120 having a start address SA of 0 and an end address EA of 100, which is included in the RAM 730. Similar to FIG. 9, FIG. 11 illustrates a case in which the cache memory 722 stores the encryption information 1105 in an area corresponding to a layer structure including three layers, in detail, a first layer (Layer 0) 1111, a second layer (Layer 1) 1112, and a third layer (Layer 2) 1113.

When the block area 1120 of FIG. 11 corresponds to the first area 911 of FIG. 9, the first layer (Layer 0) 1111, the second layer (Layer 1) 1112, and the third layer (Layer 2) 1113 of FIG. 11 may correspond to the first layer 961, the second layer 962, and the third layer 963 of FIG. 9, respectively.

Referring to FIG. 11, a write request is received by the processor 710 at each time point (t0, t1, t7) over time, data requested to be written in response to a write request received at a certain time point is encrypted using an encryption parameter, and the encrypted data is written to at least a portion of the block area 1120 on the RAM 730.

Referring to a block 1115 of FIG. 11, an area on the RAM 730 to which cipher data is to be written may be designated at a time point t0. The processor 710 may designate a write area, based on setting of a user or setting of the processor 710. The processor 710 may set an encryption parameter that is to be applied to the designated area. For example, the electronic apparatus 700 may designate an area on the RAM 730 having a start address SA of 0 and an end address EA of 100, as the area on the RAM 730 to which cipher data is to be written, at the time point t0. The electronic apparatus 700 may set, as A, an encryption parameter that is to be applied to the designated 0-100 block area 1120. In detail, the cache device 720 may set the encryption parameter to be applied to the block area 1120 to be A, and may generate the encryption information 1121 such that the encryption information 1121 corresponds to the set area and the encryption parameter.

Initialized address information included in the encryption information 1121 may be generated via operation S1010 of FIG. 10.

Because the encryption information 1121 is information corresponding to data that is to be initially written to the 0-100 block area 1120 on the RAM 730, the encryption information 1121 may be stored in an area corresponding to the first layer 1111, which is the uppermost layer of the cache memory 722. The encryption information 1121 corresponding to initial data, which is data to be initially written to a certain block area on the RAM 730, may neither be changed nor deleted even during a subsequent re-write process and may be continuously stored in the first layer 1111, which is the uppermost layer of the cache memory 722.

The electronic apparatus 700 may receive a write request for requesting writing of data to an area designated at the time point t0. For example, when the initial data is requested to be written to the entire designated area, received data may be encrypted using the encryption parameter A under the control of the processor 710 and may be written to the block area 1120 on the RAM 730 having the start address SA of 0 and the end address EA of 100.

The cache device 720 may generate the encryption information 1121 including location information of the area on the RAM 730 to which encrypted data is written and an encryption parameter for use in encryption, and may store the generated encryption information 1121 in the cache memory 722.

Referring to the block 1130 of FIG. 11 and FIG. 10, at a time point t1 subsequent to the time point t0, the processor 710 receives certain data and a write request for requesting writing of cipher data corresponding to the certain data to a 5-20 block area 1131 of the RAM 730 (S1015). In information about a block area included in the write request, a value 5 may correspond to a write start address (WSA), and a value 20 may correspond to a write end address (WEA).

The cache device 720 may determine whether encryption information corresponding to a block area including the 5-20 block area 1131 included in the RAM 730 exists (S1015 through S1025).

To determine whether the encryption information corresponding to the block area corresponding to the write request exists, the cache device 720 may search the cache memory 722, starting from an area included in a lower layer of the cache memory 722. For example, the cache device 720 may determine whether encryption information corresponding to the 5-20 block area 1131 corresponding to the write request received at the time point t1 exists on a second layer, and, when the encryption information does not exist on the second layer, the cache device 720 may determine whether the encryption information exists on a first layer, which is an upper layer of the second layer. The operation of searching for encryption information, starting from the lower layer, will be described below in detail with reference to operations S1320 through S1340 of FIG. 13.

The cache device 720 may determine that a previously set write area including the 5-20 block area 1131, for example, the block area 1120, exists, and may obtain the encryption information 1121 corresponding to the block area 1120. The cache updater 721 newly generates encryption information 1133 including address information about the 5-20 block area 1131 and an encryption parameter, for example, B, which is applied to the data received at the time point t1 (S1041). The data received at the time point t1 may be referred to as time point t1 update data, and data received at a certain time point will now be referred to as certain time point update data.

Accordingly, the encryptor 741 may encrypt the time point t1 update data by using the encryption parameter B and may write the encrypted time point t1 update data to the 5-20 block area of the RAM 730, as indicated by reference numeral 1132.

The newly generated encryption information 1133 may be stored in an area corresponding to the second layer 1112, which is a lower layer associated with the encryption information 1121 stored in an area corresponding to the first layer 1111. In detail, as shown in the block 1130, the encryption information 1133 may be stored on the lower layer associated with the encryption information 1121. Accordingly, in response to the write request received at the t1 time point, the existing encryption information 1121 may be updated and thus the encryption information 1133 associated with the encryption information 1121 may be generated.

Referring to the block 1140 of FIG. 11, at a time point t2 subsequent to the time point t1, the processor 710 receives time point t2 update data and a write request for requesting writing of cipher data corresponding to the time point t2 update data to a 40-80 block area 1141 of the RAM 730. In response to the write request, the cache device 720 may determine whether encryption information corresponding to a block area including the 40-80 block area 1141 on the RAM 730 exists. Because a previous write area including the 40-80 block area 1141, in detail, the block area 1120, exists, the cache updater 721 newly generates encryption information 1143 including address information about the 40-80 block area 1141 and an encryption parameter, for example, C, which is applied to the time point t2 update data.

Accordingly, the encryptor 741 may encrypt the time point t2 update data by using the encryption parameter C and may write the encrypted time point t2 update data to the 40-80 block area of the RAM 730, as indicated by reference numeral 1142.

The newly generated encryption information 1143 may be stored in the area corresponding to the second layer 1112, which is a lower layer associated with the encryption information 1121 stored in the area corresponding to the first layer 1111 (S1042). In detail, as shown in the block 1140, the encryption information 1143 may be stored on the lower layer associated with the encryption information 1121. Because the 5-20 block area 1131 and the 40-80 block area 1141 do not overlap each other, the encryption information 1133 corresponding to the 5-20 block area 1131 and the encryption information 1143 corresponding to the 40-80 block area 1141 may be stored in an area corresponding to the same layer, namely, the second layer 1112.

Accordingly, in response to the write request received at the time point t2, the encryption information 1121 and the encryption information 1133, which are existing encryption information shown in the block 1130, may be updated, and thus new encryption information 1133 associated with the encryption information 1121 and stored on the same layer as the existing encryption information 1133 may be generated.

Referring to a block 1150 of FIG. 11, at a time point t3 subsequent to the time point t2, the processor 710 receives time point t3 update data and a write request for requesting writing of cipher data corresponding to the time point t3 update data to a 10-30 block area 1151 of the RAM 730. In response to the write request, the cache device 720 may determine whether encryption information corresponding to a block area including the 10-30 block area 1151 on the RAM 730 exists. The cache device 720 may determine that the block area 1131, which is a previous write area including a portion of the 10-30 block area 1151, and the block area 1120, which is a previous write area including the entire 10-30 block area 1151, exist.

The cache device 720 may not update encryption information corresponding to the block area 1120 including the entire 10-30 block area 1151 because the encryption information is the encryption information 1121 corresponding to the initial data, and may update the encryption information 1133 corresponding to the block area 1131, which is a previous write area including a portion of the 10-30 block area 1151, by reflecting the write request received at the time point t3. In detail, the cache device 720 may maintain the value of the start address SA as 5 and change the value of the end address EA to 30 such that the address information included in the encryption information 1133 generated at the time point t1 includes the location of a 10-30 block area, which is the location of a write area according to the write request received at the time point t3 (S1043). Accordingly, the cache device 720 may update the encryption information 1133 stored in the area corresponding to the second layer and thus may newly store encryption information 1154.

FIG. 11 illustrates a case in which the cache device 720 does not change the value B of the encryption parameter included in the encryption information 1133 when generating the encryption information 1154 by updating the encryption information 1133. However, the cache device 720 may change the value B of the encryption parameter included in the encryption information 1133 when generating the encryption information 1154 by updating the encryption information 1133.

The cache device 720 may generate encryption information 1155 having a start address SA of 10 and an end address EA of 30 such that the encryption information 1155 corresponds to the time point t3 update data. The cache device 720 may store the generated encryption information 1155 in an area corresponding to the third layer 1113, which is a lower layer associated with the encryption information 1154. The encryption information 1155 may include an encryption parameter D.

Accordingly, the encryptor 741 may encrypt the time point t3 update data by using the encryption parameter D included in the encryption information 1155, and may write the encrypted time point t3 update data to the 10-30 block area 1151 of the RAM 730, as indicated by reference numeral 1153.

Referring to the block 1160 of FIG. 11, at a time point t4 subsequent to the time point t3, the processor 710 receives time point t4 update data and a write request for requesting writing of cipher data corresponding to the time point t4 update data to a 50-70 block area 1161 of the RAM 730. In response to the write request, the cache device 720 may determine whether encryption information corresponding to a block area including the 50-70 block area 1161 on the RAM 730 exists. The cache device 720 may determine that a block area 1141, which is a previous write area including the 50-70 block area 1161, exists.

Because encryption information corresponding to the block area 1120 including the 50-70 block area 1161 is the encryption information 1121 corresponding to the initial data, the cache device 720 does not update the encryption information 1121. The cache device 720 may generate encryption information by reflecting the write request received at the time point t4, on a lower layer of the encryption information 1143 corresponding to the block area 1141, which is a previous write area including the 50-70 block area 1161. Accordingly, the cache device 720 may store encryption information 1165 in an area corresponding to the third layer 1113.

In detail, the cache device 720 may generate encryption information 1165 having a start address SA of 50 and an end address EA of 70 to correspond to the time point t4 update data and including an encryption parameter E. The cache device 720 may store the generated encryption information 1165 in the area corresponding to the third layer 1113, which is a lower layer associated with the encryption information 1143. The encryption information 1165 may include the encryption parameter E.

Accordingly, the encryptor 741 may encrypt the time point t4 update data by using the encryption parameter E included in the encryption information 1165, and may write the encrypted time point t4 update data to the 50-70 block area 1161 of the RAM 730, as indicated by reference numeral 1163.

Referring to the block 1170 of FIG. 11, at a time point t5 subsequent to the time point t4, the processor 710 receives time point t5 update data and a write request for requesting writing of cipher data corresponding to the time point t5 update data to the 20-60 block area 1171 of the RAM 730. In response to the write request, the cache device 720 may determine whether encryption information corresponding to the 20-60 block area 1171 on the RAM 730 exists. As a result of the determination, the cache device 720 may determine that the encryption information 1155 and the encryption information 1165 exist as encryption information corresponding to the 20-60 block area 1171 on the RAM 730. In detail, when encryption information corresponding to at least a portion of a block area corresponding to the write request exists, the cache device 720 may determine that encryption information corresponding to the block area corresponding to the write request exists.

Accordingly, the cache device 720 may detect the encryption information 1155 corresponding to the 10-30 block area 1151, which is at least a portion of the 20-60 block area 1171, and the encryption information 1165 corresponding to the 50-70 block area 1161, which is at least a portion of the 20-60 block area 1171. The cache device 720, in detail, the cache updater 721, may update the detected encryption information 1155 and the detected encryption information 1165 by reflecting the write request received at the time point t5.

In detail, the cache updater 721 may update the detected encryption information 1155 and the detected encryption information 1165 such that respective start address values and respective end addresses values included in the encryption information 1155 and the encryption information 1165 reflect the location information of the 20-60 block area 1171 corresponding to the write request. Accordingly, the cache updater 721 may generate encryption information 1175 and encryption information 1177 respectively corresponding to the encryption information 1155 and the encryption information 1165.

In detail, the cache updater 721 may generate the encryption information 1175 by changing the value of the end address EA of the encryption information 1155 from 30 to 60, such that the start address SA and the end address EA included in the encryption information 1155 may include the 20-60 block area 1171 corresponding to the write request received at the time point t5. As the encryption information 1155 is updated to the encryption information 1175, the cache updater 721 may also update the encryption information 1154 corresponding to an upper layer of the encryption information 1155. In detail, the cache updater 721 may generate encryption information 1174 by changing the value of the end address EA of the encryption information 1154 from 30 to 60, such that an area formed by the start address and the end address of the encryption information 1154 may include an area formed by the start address and the end address of the encryption information 1175.

As the encryption information 1155 is updated, the cache updater 721 may change at least one of the start address SA and the end address EA included in the encryption information 1165 to generate updated encryption information 1177 corresponding to the encryption information 1165 such that the start address SA and the end address EA included in the encryption information 1177 do not overlap the start address SA and the end address EA included in the encryption information 1175. In detail, the cache updater 721 may generate the encryption information 1177 by changing the value of the start address SA included in the encryption information 1165 from 50 to 60.

As the encryption information 1165 is updated to the encryption information 1177, the cache updater 721 may also update the encryption information 1143 corresponding to an upper layer of the encryption information 1165. In detail, the cache updater 721 may generate encryption information 1176 by changing the value of the start address SA of the encryption information 1143 from 40 to 60, such that an area formed by the start address and the end address of the encryption information 1143 may include an area formed by the start address and the end address of the encryption information 1177.

Accordingly, the encryptor 741 may encrypt the time point t5 update data by using the encryption parameter D included in the encryption information 1175, and may write the encrypted time point t5 update data to a 10-70 block area of the RAM 730, as indicated by reference numeral 1172.

Referring to the block 1170 of FIG. 11, at a time point t5 subsequent to the time point t4, the processor 710 receives a time point t5 update data and a write request for requesting writing of cipher data corresponding to the time point t5 update data to the 20-60 block area 1171 of the RAM 730. In response to the write request, the cache device 720 may determine whether encryption information corresponding to the 20-60 block area 1171 on the RAM 730 exists. As a result of the determination, the cache device 720 may determine that the encryption information 1155 and the encryption information 1165 exist as encryption information corresponding to the 20-60 block area 1171 on the RAM 730. In detail, when encryption information corresponding to at least a portion of a block area corresponding to the write request exists, the cache device 720 may determine that encryption information corresponding to the block area corresponding to the write request exists.

Accordingly, the cache device 720 may detect the encryption information 1155 corresponding to the 10-30 block area 1151, which is at least a portion of the 20-60 block area 1171, and the encryption information 1165 corresponding to the 50-70 block area 1161, which is at least a portion of the 20-60 block area 1171. The cache device 720, in detail, the cache updater 721, may update the detected encryption information 1155 and the detected encryption information 1165 by reflecting the write request received at the time point t5.

In detail, the cache updater 721 may update the detected encryption information 1155 and the detected encryption information 1165 such that respective start address values and respective end addresses values included in the encryption information 1155 and the encryption information 1165 reflect the location information of the 20-60 block area 1171 corresponding to the write request. Accordingly, the cache updater 721 may generate encryption information 1175 and encryption information 1177 respectively corresponding to the encryption information 1155 and the encryption information 1165.

In detail, the cache updater 721 may generate the encryption information 1175 by changing the value of the end address EA of the encryption information 1155 from 30 to 60, such that the start address SA and the end address EA included in the encryption information 1155 may include the 20-60 block area 1171 corresponding to the write request received at the time point t5. As the encryption information 1155 is updated to the encryption information 1175, the cache updater 721 may also update the encryption information 1154 corresponding to an upper layer of the encryption information 1165. In detail, the cache updater 721 may generate encryption information 1174 by changing the value of the end address EA of the encryption information 1154 from 30 to 60, such that an area formed by the start address and the end address of the encryption information 1154 may include an area formed by the start address and the end address of the encryption information 1175.

As the encryption information 1155 is updated, the cache updater 721 may change at least one of the start address SA and the end address EA included in the encryption information 1165 to generate updated encryption information 1177 corresponding to the encryption information 1165 such that the start address SA and the end address EA included in the encryption information 1177 do not overlap the start address SA and the end address EA included in the encryption information 1175. In detail, the cache updater 721 may generate the encryption information 1177 by changing the value of the start address SA included in the encryption information 1165 from 50 to 60.

As the encryption information 1165 is updated to the encryption information 1177, the cache updater 721 may also update the encryption information 1143 corresponding to an upper layer of the encryption information 1165. In detail, the cache updater 721 may generate encryption information 1176 by changing the value of the start address SA of the encryption information 1143 from 40 to 60, such that an area formed by the start address and the end address of the encryption information 1143 may include an area formed by the start address and the end address of the encryption information 1177.

Accordingly, the encryptor 741 may encrypt the time point t5 update data by using the encryption parameter D included in the encryption information 1175, and may write the encrypted time point t5 update data to a 10-70 block area of the RAM 730, as indicated by reference numeral 1172.

Referring to the block 1180 of FIG. 11, at a time point t6 subsequent to the time point t5, the processor 710 receives time point t6 update data and a write request for requesting writing of cipher data corresponding to the time point t6 update data to a 0-30 block area 1181 of the RAM 730. In response to the write request, the cache device 720 may determine whether encryption information corresponding to the 0-30 block area 1181 on the RAM 730 exists. As a result of the determination, the cache device 720 may determine that the encryption information 1175 exists as encryption information corresponding to the 0-30 block area 1181 on the RAM 730. In detail, when encryption information corresponding to at least a portion of a block area corresponding to the write request exists, the cache device 720 may determine that encryption information corresponding to the block area corresponding to the write request exists.

Accordingly, the cache device 720 may detect encryption information 1175 corresponding to a 10-60 block area overlapped by at least a portion of the 0-30 block area 1181. The cache device 720, in detail, the cache updater 721, may update the detected encryption information 1175 by reflecting the write request received at the time point t6. The cache device 720 may set an encryption parameter that is to be applied to the time point t6 update data, as A. Then, the encryptor 741 may encrypt the time point t6 update data by using the encryption parameter A and may write the encrypted time point t6 update data to the 0-30 block area 1181 of the RAM 730, as indicated by reference numeral 1182. The cache device 720 may generate encryption information 1185 by changing the start address of the encryption information 1175 from 10 to 30 in consideration of the time point t6 update data written (as indicated by reference numeral 1182) to the 0-30 block area 1181. The cache device 720 may generate encryption information 1184 by changing the start address of the encryption information 1174 existing on the upper layer of the encryption information 1175 from 5 to 30 by reflecting the start address of the generated encryption information 1185. The cache device 720 may generate the encryption information 1184 by changing the encryption parameter included in the encryption information 1174 from B to D. In this case, the encryption information 1184 and the encryption information 1185 are the same as each other and are repeated, and thus the cache device 720 may delete the encryption information 1185 (S1045). Accordingly, no encryption information exists on the lower layer associated with the encryption information 1184.

Referring to a block 1190 of FIG. 11, at a time point t7 subsequent to the time point t6, the processor 710 receives time point t7 update data and a write request for requesting writing of cipher data corresponding to the time point t7 update data to a 60-70 block area 1191 of the RAM 730. In response to the write request, the cache device 720 may determine whether encryption information corresponding to the 60-70 block area 1191 on the RAM 730 exists. As a result of the determination, the cache device 720 may determine that the encryption information 1177 exists as encryption information corresponding to the 60-70 block area 1191 on the RAM 730.

According to the embodiment of the block 1190, address information included in the encryption information 1177 is the same as the 60-70 block area 1191, which is a block area of the RAM 730 corresponding to the write request received at the time point t7.

Accordingly, the cache device 720 may detect encryption information 1177 corresponding to a block area overlapped by the 60-70 block area 1191. The cache device 720, in detail, the cache updater 721, may update the detected encryption information 1177 by reflecting the write request received at the time point t7.

For example, the cache updater 721 may change an encryption parameter of the encryption information 1177 from E to another value by updating the detected encryption information 1177 by reflecting the write request received at the time point t7. An embodiment in which the value of the encryption parameter of the encryption information 1177 is changed is not shown in the block 1190 of FIG. 11.

Alternatively, the cache updater 721 may delete the encryption information 1177 by reflecting the write request received at the time point t7. Referring to the block 1180, before the time point t7, the time point t6 update data encrypted using the encryption parameter E has been written to a 60-70 block area, as indicated by reference 1173. The cache device 720 may update encryption information such that a 60-70 block area 1191 may be encrypted by applying an encryption parameter other than the encryption parameter E, by reflecting the write request received at the time point t7. For example, the cache device 720 may generate encryption information 1193 by changing an end address of the encryption information 1184 to 70. Accordingly, the time point t7 update data received at the time point t7 may be encrypted using the encryption parameter D, and the encrypted time point t7 update data may be written to the 60-70 block area 1191. The cache device 720 may generate encryption information 1195 by changing the start address of the encryption information 1176 from 60 to 70 by reflecting a change in the end address of the updated encryption information 1193.

As described above, the electronic apparatus 700 according to an embodiment may update encryption information corresponding to data written to RAM at each time point when data is written to the RAM, such that an encrypted data value varies according to time points when data is written to the RAM.

In detail, every time data is written to the RAM, for example, every time a write request of certain data is received, the electronic apparatus 700 according to an embodiment updates encryption information by reflecting a received write request. Accordingly, pieces of data encrypted using different encryption parameters are written to different block sections having a variable size on the RAM 730. For example, referring to the block 1140 of FIG. 11, after the time point t2, data encoded using the encryption parameter B is written to a 5-20 block area in the 0-100 block area of the RAM 730, as indicated by reference 1132, data encoded using the encryption parameter C is written to a 40-80 block area therein, as indicated by reference 1142, and data encoded using the encryption parameter A is written to a remaining block area. When a new write request is received over time, the received write request is reflected, and thus data encrypted using a changed encryption parameter value is written to a certain block on the RAM 730.

Accordingly, the electronic apparatus 700 according to an embodiment may increase the difficulty of decrypting cipher data that is written to the RAM 730. Accordingly, security performance of the electronic apparatus 700 may be highly maintained.

Moreover, the electronic apparatus 700 according to an embodiment does not use data other than data that is to be encrypted, for example, data written to an adjacent block on RAM, during encryption and decryption. Accordingly, access performance necessary for encryption and decryption may be highly maintained. In detail, to encrypt data that is to be encrypted, data written to an adjacent block on the RAM does not need to be read, and thus the RAM does not need to be accessed, whereby high access performance may be maintained.

Figure 12:
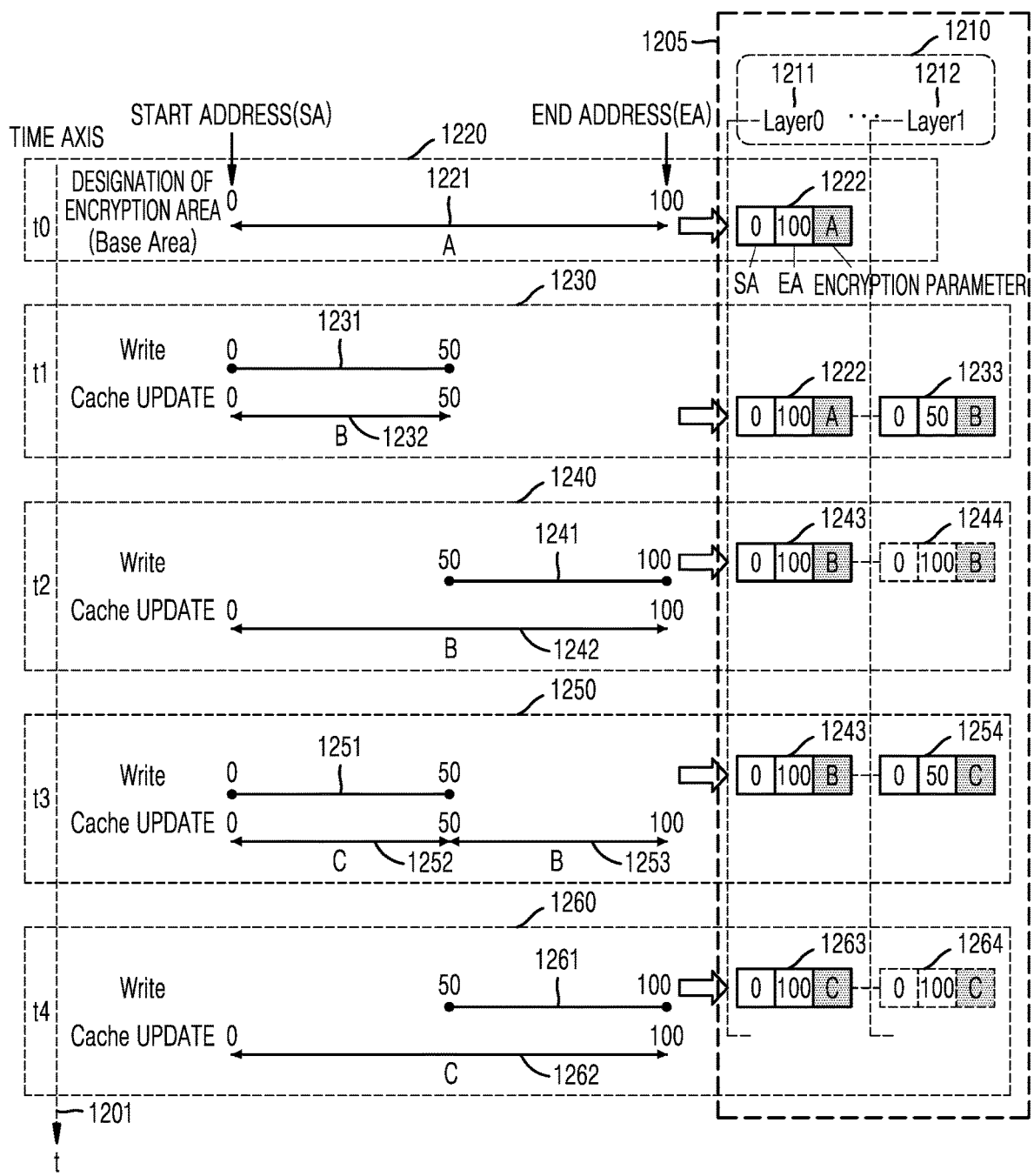
FIG. 12 is a diagram for explaining an encryption information updating operation of an electronic apparatus, according to an embodiment.

FIG. 12 is a diagram for explaining an encryption information updating operation of an electronic apparatus according to an embodiment.

Data about visual images may exist among data that requires protection of a copyright or data for which arbitrary duplication or arbitrary reading should not be allowed. The data about visual images may be formed as image frame data including a plurality of image frames. When image frame data that requires protection of a copy right is reproduced, the image frame data may be stored within the RAM 730 for buffering. As such, when the image frame data is written to the RAM 730, the electronic apparatus 700 may use a circular queue method of enabling the plurality of image frames included in the image frame data to be sequentially written to the RAM 730 and managed. A circuit queue is a type of data structure, and means a queue that enables pieces of data stored in a queue to circulate by connecting a start and an end of the queue. When the plurality of image frames are written and managed in the circular queue method, the plurality of image frames may be repeatedly re-written to a certain area of the RAM 730. An operation of updating encryption information when a plurality of images frames are written to the RAM 730 and managed in the circular queue method will now be described in detail with reference to FIG. 12.

FIG. 12 illustrates a case in which encryption information 1205 stored in the cache device 720 includes location information including a start address SA and an end address EA, similar to the encryption information 1105 of FIG. 11. FIG. 12 also illustrates a case in which, similar to FIG. 11, a data write area included in the RAM 730 corresponding to a time point to is a block area 1221 having a start address SA of 0 and an end address EA of 100.

FIG. 12 also illustrates a case in which the cache memory 722 stores the encryption information 1205 in an area corresponding to a layer structure including two layers, in detail, a first layer (Layer 0) 1211 and a second layer (Layer 1) 1212.

Referring to FIG. 12, image frames having the same size at each certain time point over time may be consecutively written to the RAM 730.

Referring to a block 1220 of FIG. 12, the electronic apparatus 700 may designate an area on the RAM 730 having a start address SA of 0 and an end address EA of 100, as an area on the RAM 730 to which cipher data is to be written, at the time point t0. The cache device 720 may set, as A, an encryption parameter that is to be applied to data which is to be written to the area designated at the time point t6. Accordingly, the cache device 720 may generate and store encryption information 1222 including a start address SA of 0, an end address EA of 100, and an encryption parameter A.

Referring to a block 1230 of FIG. 12, when a single image frame has a size corresponding to a 0-50 block area 1231, the processor 710 receives a time point t1 image frame and a write request for requesting writing of the time point t1 image frame to the 0-50 block area 1231, at a time point t1. In response to the write request received at the time point t1, the cache device 720 may determine whether encryption information corresponding to a block area including the 0-50 block area 1231 on the RAM 730 exists. Because a previously-set write area including the 0-50 block area 1231, for example, the block area 1221, exists, the cache updater 721 newly generates encryption information 1233 including address information about the 0-50 block area 1231 and an encryption parameter B which is applied to encrypt the t1 time point image frame. The cache device 720 may store the generated encryption information 1233 in an area corresponding to the second layer 1212, which is a lower layer of the encryption information 1222 generated at the time point t0.

Accordingly, the encryptor 741 may encrypt the time point t1 image frame by using the encryption parameter B and may write the encrypted time point t1 image frame to the 0-50 block area 1231 of the RAM 730, as indicated by reference numeral 1232.

Referring to a block 1240 of FIG. 12, at a time point t2 subsequent to the time point t1, the processor 710 receives a time point t2 image frame and a write request for requesting writing of cipher data corresponding to the time point t2 image frame to a 50-100 block area 1241 of the RAM 730. In response to the write request, the cache device 720 may determine whether encryption information corresponding to a block area including the 50-100 block area 1241 on the RAM 730 exists. In detail, because a previous write area including the 50-100 block area 1241, in detail, the block area 1221, exists, the cache updater 721 may update encryption information such that the time point t2 image frame may be encrypted using an encryption parameter different from the encryption parameter A that is applied to the block area 1221.

In detail, the cache device 720 may generate encryption information (not shown) including address information representing the 50-100 block area 1241 and an encryption parameter B, which is to be applied during encryption of the time point t2 image frame, in addition to the encryption information 1233 updated in response to the write request received at the time point t1, and store the generate encryption information in an area corresponding to the second layer 1212, which is a lower layer associated with the encryption information 1222. In this case, because the encryption information to be newly generated and stored on the second layer 1212 has a start address SA of 50, an end address EA of 100, and an encryption parameter B, the cache device 720 may generate encryption information 1244 by combining the encryption information 1233 with the encryption information to be newly generated and stored on the second layer 1212. However, because the generated encryption information 1244 has the same start address and the same write address as the encryption information 1222 previously stored on an upper layer than the generated encryption information 1244, the cache device 720 may generate encryption parameter 1243 by changing the value of the encryption parameter of the encryption information 1222 from A to B without adding the encryption information 1244 to an area corresponding to the second layer 1212.

Accordingly, the encryptor 741 may encrypt the time point t2 image frame by using the encryption parameter B and may write the encrypted time point t2 image frame to the 50-100 block area 1241 of the RAM 730, as indicated by reference numeral 1242.

At a time point t3 subsequent to the time point t2, the processor 710 receives a time point t3 image frame and a write request for requesting writing of the time point t3 image frame to a 0-50 block area 1251. In response to the write request received at the time point t3, the cache device 720 may determine whether encryption information corresponding to a block area including the 0-50 block area 1251 on the RAM 730 exists. Because a previously-set write area including the 0-50 block area 1251, for example, the block area 1231, exists, the cache updater 721 newly generates encryption information 1254 including address information about the 0-50 block area 1251 and an encryption parameter C which is applied to encrypt the time point t3 image frame. The cache device 720 may store the generated encryption information 1254 in an area corresponding to the second layer 1212, which is a lower layer of the encryption information 1243.

Accordingly, the encryptor 741 may encrypt the time point t3 image frame by using the encryption parameter C and may write the encrypted time point t3 image frame to the 0-50 block area 1251 of the RAM 730, as indicated by reference numeral 1252.

Referring to a block 1260 of FIG. 12, at a time point t4 subsequent to the time point t3, the processor 710 receives a time point t4 image frame and a write request for requesting writing of cipher data corresponding to the time point t4 image frame to a 50-100 block area 1261 of the RAM 730. In response to the write request, the cache device 720 may determine whether encryption information corresponding to a block area including the 50-100 block area 1261 on the RAM 730 exists. As a result, the encryption information 1243 exists, and thus the cache updater 721 may update encryption information such that the time point t4 image frame may be encrypted using an encryption parameter different from the encryption parameter A included in the encryption information 1243.

In detail, the cache device 720 may generate encryption information including address information representing the 50-100 block area 1261 and an encryption parameter C, which is to be applied during encryption of the time point t4 image frame, in addition to the encryption information 1254 updated in response to the write request received at the time point t4, and store the generated encryption information in an area corresponding to the second layer 1212, which is a lower layer associated with the encryption information 1243. In this case, the encryption information to be newly generated and stored on the second layer 1212 has a start address SA of 50, an end address EA of 100, and an encryption parameter C, and thus the cache device 720 may generate encryption information 1264 by combining the encryption information 1254 with the encryption information to be newly generated and stored on the second layer 1212. However, because the generated encryption information 1264 has the same start address and the same write address as the encryption information 1243 previously stored on an upper layer than the generated encryption information 1264, the cache device 720 may generate encryption parameter 1263 by changing the value of the encryption parameter of the encryption information 1243 from B to C without adding the encryption information 1264 to an area corresponding to the second layer 1212.

Accordingly, the encryptor 741 may encrypt the time point t4 image frame by using the encryption parameter C and may write the encrypted time point t4 image frame to the 50-100 block area 1261 of the RAM 730, as indicated by reference numeral 1262.

As described above with reference to FIG. 12, when a plurality of image frames are written to and stored in the RAM 730 according to the circular queue method, encryption information may be stored and used by using the cache memory 722 including a storage area having a two-layer structure. Image frames may be efficiently written to and stored in two distinguished block areas on the RAM 730.

Figure 13:
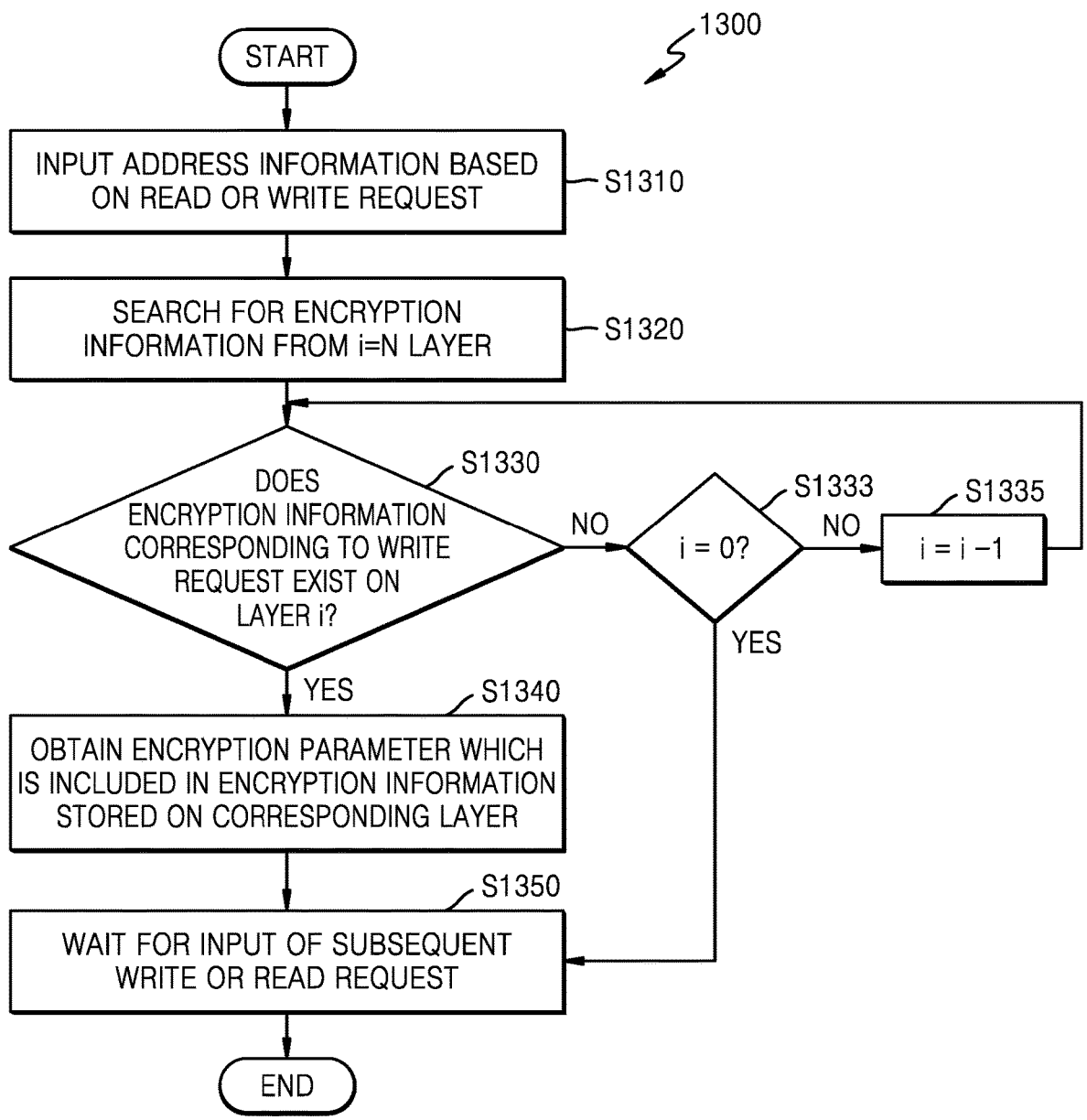
FIG. 13 is a flowchart of an operation of a cache device, according to an embodiment.

FIG. 13 is a flowchart of an operation of a cache device according to an embodiment.

Referring to FIG. 13, address information based on a read or write request is obtained, in operation S1310.

A case that a write request is received in operation S1310 will be first described.

In detail, the processor 710 may receive a write request for requesting writing of certain data to a certain area on the RAM 730, in operation S1310. Then, the processor 710 transmits the received write request to the cache device 720. Accordingly, the cache device 720 may receive address information corresponding to the write request, for example, address information including a write start address (WSA) and a write end address (SEA). The address information including the write start address (WSA) and the write end address (WEA) may be referred to as a write address.

Accordingly, the cache searcher 723 searches for encryption information corresponding to the wire address. In detail, when an uppermost layer is a zero-th layer and a lowermost layer is an N-th layer in a layer structure formed in the cache memory 722, the cache searcher 723 may search for the encryption information from an i=N layer, which is the lowermost layer, in operation S1320. Herein, N may differ according to the number of layers included in the layer structure formed in the cache memory 722. The electronic apparatus 700 may set the number of layers included in the layer structure, based on a storage capacity of the cache memory 722, a search speed of the cache searcher 723, and the like.

In operation S1330, it is determined whether the encryption information corresponding to the write request exists on the i=N layer. Operation S1330 may be performed in the cache searcher 723.

When the encryption information corresponding to the write request exists on the i=N layer, an encryption parameter to be included in the encryption information stored on the corresponding layer is obtained, in operation S1340.

On other hand, when the encryption information corresponding to the write request does not exist on the i=N layer, it may be determined whether i=0 (i.e., whether only the uppermost layer exists), in operation S1333. When only the uppermost layer does not exist, it may be determined whether encryption information exists on a previous upper layer of the N-th layer, in operation S1335 (and S1330).

Based on the write request, the encryption information may be updated. In detail, the cache device 720 may change at least one of address information and an encryption parameter, based on the received write request, update the encryption information, based on the change, and store updated encryption information.

When the updating and storing of the encryption information is completed, the cache device 720 may wait for an input of a subsequent write request, in operation S1350.

A case that a read request is received in operation S1310 will now be described.

In detail, the processor 710 may receive a read request for requesting reading of certain cipher data from a certain area on the RAM 730, in operation S1310. Then, the processor 710 may transmit the received read request to the cache device 720. Accordingly, the cache device 720 may receive address information corresponding to the read address. Address information indicating a location of the certain area on the RAM 730, which is included in the read request, may be referred to as a read address.

Accordingly, the cache searcher 723 searches for encryption information corresponding to the read address. In detail, when an uppermost layer is a zero-th layer and a lowermost layer is an N-th layer in a layer structure formed in the cache memory 722, the cache searcher 723 may search for the encryption information from an i=N layer, which is the lowermost layer, in operation S1320. For example, when the read request is a signal requesting a read operation with respect to a 0-30 block area on the RAM 730, the cache searcher 723 may search for encryption information including a start address SA and an end address EA corresponding to an area including the 0-30 block area.

In detail, in operation S1330, it is determined whether the encryption information corresponding to the read request exists on the i=N layer. Operation S1330 may be performed in the cache searcher 723.

When the encryption information corresponding to the read request exists on the i=N layer, an encryption parameter to be included in the encryption information stored on the corresponding layer is obtained, in operation S1340.

For example, when encryption information including a start address SA and an end address EA corresponding to an area including the 0-30 block area is found from an area corresponding to the i=N layer, which is a certain layer of the cache memory 722, the cache searcher 723 may obtain an encryption parameter included in the found encryption information and transmit the obtained encryption parameter to the decryptor 742.

On the other hand, when the encryption information corresponding to the read request does not exist on the i=N layer, it may be determined whether i=0 (i.e., whether only the uppermost layer exists), in operation S1333. When only the uppermost layer does not exist, it may be determined whether encryption information exists on a previous upper layer of the N-th layer, in operation S1335 (and S1330).

The decryptor 742 may receive the encryption parameter from the cache searcher 723, and may decrypt cipher data (128 bits) read from the certain area of the RAM 730, based on the received encryption parameter. The decrypted data may be referred to as read data. The decryptor 742 may transmit read data, which is decrypted data, to the processor 710.

In operation 1350, the cache device 720 may wait for an input of a subsequent read request.

Figure 14:
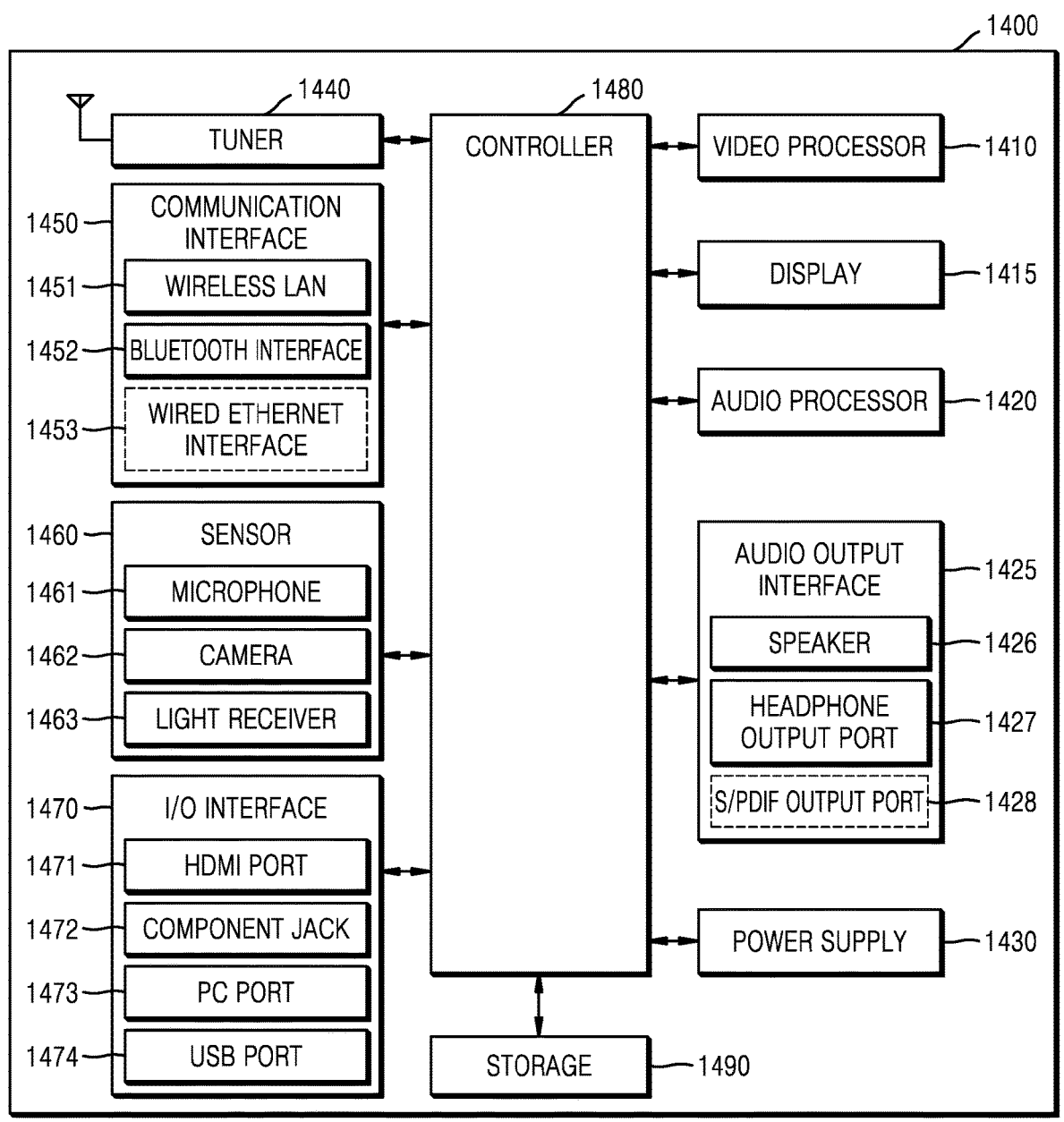
FIG. 14 is a block diagram of a display apparatus including an electronic apparatus, according to an embodiment.

FIG. 14 is a block diagram of a display apparatus including an electronic apparatus according to an embodiment.

An electronic apparatus according to an embodiment may be included in a display apparatus. In detail, the display apparatus is an apparatus for visually outputting a screen image, such as image content, advertisement and guide information, or a user interface (UI) screen image, to a user.

Examples of the display apparatus may include, but are not limited to, a TV and a digital broadcasting terminal.

Referring to FIG. 14, a display apparatus 1400 includes a video processor 1410, a display 1415, an audio processor 1420, an audio output interface 1425, a power supply 1430, a tuner 1440, a communication interface 1450, a sensor 1460, an input/output (I/O) interface 1470, a controller 1480, and a storage 1490.

The controller 1480 may correspond to the electronic apparatus 500 or 600 according to an embodiment. Alternatively, the processor 510 or 610 and the encryption/decryption unit 640 included in the electronic apparatus 500 or 600 according to an embodiment may correspond to the controller 1480 of FIG. 14, and the first memory device 530 or 630 and the second memory device 520 or 620 included in the electronic apparatus 500 or 600 according to an embodiment may correspond to the storage 1490 of FIG. 14.

The controller 1480 may also correspond to the electronic apparatus 700 according to an embodiment. The processor 710 and the encryption/decryption unit 740 included in the electronic apparatus 700 according to an embodiment may correspond to the controller 1480 of FIG. 14, and the RAM 730 and the cache device 720 included in the electronic apparatus 700 according to an embodiment may correspond to the storage 1490 of FIG. 14.

Accordingly, a description of the display apparatus 1400 of FIG. 14 that is the same as that of the electronic apparatus 500, 600, or 700 will not be repeated below.

The video processor 1410 processes video data that is received by the display apparatus 1400. The video processor 1410 may perform a variety of image processing, such as decoding, scaling, noise filtering, frame rate transformation, and resolution transformation, on the received video data.

The controller 1480 may receive a write request with respect to the video data processed by the video processor 1410, and may control the video data to be encrypted and written to a first memory device included in the controller 1480 or the storage 1490, for example, a RAM. The operation of encrypting video data, which is data input in response to a write request, and writing the encrypted video data to the first memory device, for example, the RAM has been described above in detail when the electronic apparatus 500, 600 or 700 according to an embodiment has been described above, and thus a repeated description thereof will be omitted.

The data processed by the video processor 1410 may include a plurality of image frames. The controller 1480 may manage the plurality of image frames processed by the video processor 1410 in the circular queue method described in detail with reference to FIG. 12.

The display 1415 displays video included in a broadcasting signal received via the tuner 1440 on the screen thereof, under the control of the controller 1480. The display 1415 may also display content (for example, a moving picture) that is input via the communication interface 1450 or the I/O interface 1470.

The display 1415 may also output an image stored in the storage 1490 under the control of the controller 1480. The display 1415 may also display a voice UI (e.g., including a voice command word guide) for performing a voice recognition task corresponding to voice recognition, or a motion UI (e.g., including a user motion guide for motion recognition) for performing a motion recognition task corresponding to motion recognition.

According to an embodiment, the display 1415 may display data read and decrypted from the storage 1490 that stores encrypted data.

The audio processor 1420 processes audio data. The audio processor 1420 may perform a variety of processing, such as decoding, amplification, or noise filtering, on the audio data. The audio processor 1420 may include a plurality of audio processing modules to process audios corresponding to a plurality of pieces of content.

The audio output interface 1425 outputs audio included in a broadcasting signal received via the tuner 1440, under the control of the controller 1480. The audio output interface 1425 may also output audio (for example, a voice or a sound) that is input via the communication interface 1450 or the I/O interface 1470. The audio output interface 1425 may also output audio stored in the storage 1490 under the control of the controller 1480. The audio output interface 1425 may include at least one selected from a speaker 1426, a headphone output port 1427, and a Sony/Philips Digital Interface (S/PDIF) output port 1428. The audio output interface 1425 may include a combination of the speaker 1426, the headphone output port 1427, and the S/PDIF output port 1428.

The power supply 1430 supplies power that is input from an external power source, to the internal components 1410 through 1490 of the display apparatus 1400, under the control of the controller 1480. The power supply 1430 may also supply power that is output by one or more batteries located in the display apparatus 1400, to the internal components 1410 through 1490 of the display apparatus 1400, under the control of the controller 1480.

The tuner 1440 may tune and select frequency band corresponding a channel that the display apparatus 1400 wants to receive, from among many radio wave components that are obtained by, for example, amplifying, mixing, or resonating a wired or wireless broadcasting signal. The broadcasting signal includes audio, video, and additional information (for example, an electronic program guide (EPG)).

The tuner 1440 may receive a broadcasting signal in a frequency band corresponding to a channel number (e.g., cable broadcasting No. 506) according to a user input (for example, a control signal received from an external control device (not shown) (e.g., a remote controller), e.g., a channel number input, a channel up-down input, and a channel input on an EPG screen image).

The tuner 1440 may receive a broadcasting signal from various sources, such as terrestrial broadcasting, cable broadcasting, satellite broadcasting, and Internet broadcasting. The tuner 1440 may also receive a broadcasting signal from a source such as analog broadcasting or digital broadcasting. The broadcasting signal received via the tuner 1440 is decoded (for example, audio decoding, video decoding, or additional information decoding) and is thus divided into audio, video, and/or additional information. The audio, the video, and/or the additional information may be stored in the storage 1490 under the control of the controller 1480.

The display apparatus 1400 may include a single tuner 1440 or a plurality of tuners 1440. According to an embodiment, when a plurality of tuners 1440 are included, the plurality of tuners 1440 may output a plurality of broadcasting signals to a plurality of windows included in a multi-window screen image provided to the display 1415.

The tuner 1440 may be all-in-one with the display apparatus 1400, or implemented as a separate device (for example, a tuner that is connected to a set-top box and the I/O interface 1470) having a tuner that is electrically connected to the display apparatus 1400.

The communication interface 1450 may connect the display apparatus 1400 to an external apparatus (for example, an audio apparatus) under the control of the controller 1480. The controller 1480 may transmit/receive content to/from the external apparatus connected via the communication interface 1450, download an application from the external apparatus, or perform web-browsing. In detail, the communication interface 1450 may be connected to a network to receive content from an external apparatus.

According to an embodiment, the controller 1480 may control the content received from the external apparatus to be encrypted according to an encryption operation according to an embodiment and written to a randomly accessible memory device, for example, the first memory device included in the storage 1490 or the controller 1480.

As described above, the communication interface 1450 may include at least one selected from a short-range wireless communication module, a wired communication module, and a mobile communication module.

FIG. 14 illustrates a case where the communication interface 1450 includes one of a wireless local area network (LAN) 1451, a Bluetooth network 1452, and a wired Ethernet network 1453.

The communication interface 1450 may include a combination of the wireless LAN 1451, the Bluetooth network 1452, and the wired Ethernet network 1453. The communication interface 1450 may receive a control signal of a control apparatus (not shown) under the control of the controller 1480. The control signal may be implemented as a Bluetooth signal, a radio frequency (RF) signal, or a Wi-Fi signal.

The communication interface 1450 may further include short-range communication (for example, near field communication (NFC) or Bluetooth low energy (BLE)), in addition to the Bluetooth network 1452.

The sensor 1460 senses a voice of a user, an image of the user, or an interaction with the user.

A microphone 1461 receives an uttered voice of the user. The microphone 1461 may transform the received voice into an electrical signal and output the electrical signal to the controller 1480. The user voice may include, for example, a voice corresponding to a menu or function of the display apparatus 1400. For example, a recognition range of the microphone 1461 may be recommended to be within 4 m from the microphone 1461 to a location of the user, and may vary in correspondence to the magnitude of the voice of the user and a surrounding environment (for example, a speaker sound or ambient noise).

The microphone 1461 may be integrated with or separate from the display apparatus 1400. The separated microphone 1461 may be electrically connected to the display apparatus 1400 via the communication interface 1450 or the I/O interface 1470.

It will be easily understood by one of ordinary skill in the art that the microphone 1461 may be excluded according to the performance and structure of the display apparatus 1400.

A camera 1462 receives an image (for example, consecutive frames) corresponding to a motion of the user including a gesture within a recognition range of the camera 1462. For example, the recognition range of the camera 1462 may be a distance within 0.1 to 5 m from the camera 1462 to the user. The motion of the user may include a part of the body of the user or a motion or the like of the part of the user, such as the face, a facial expression, the hand, the fist, and a finder of the user. The camera 1462 may convert a received image into an electrical signal under the control of the controller 1480 and output the electrical signal to the controller 1480.

The controller 1480 may select a menu that is displayed on the display apparatus 1400 by using a result of the recognition of the received motion, or perform control corresponding to the result of the motion recognition. For example, the control may be channel adjustment, volume adjustment, or indicator movement.

The camera 1462 may include a lens (not shown) and an image sensor (not shown). The camera 1462 may support optical zoom or digital zoom by using a plurality of lenses and image processing. The recognition range of the camera 1462 may be variously set according to the angle of the camera 1462 and surrounding environment conditions. When the camera 1462 includes a plurality of cameras, a three-dimensional (3D) still image or a 3D motion may be received by the plurality of cameras.

The camera 1462 may be integrated with or separate from the display apparatus 1400. A separate device including the separate camera 1452 may be electrically connected to the display apparatus 1400 via the communication interface 1450 or the I/O interface 1470.

It will be easily understood by one of ordinary skill in the art that the camera 1462 may be excluded according to the performance and structure of the display apparatus 1400.

A light receiver 1463 receives an optical signal (including a control signal) from the external control apparatus via a light window of the bezel of the display 1415. The light receiver 1463 may receive an optical signal corresponding to a user input (for example, touch, pressing, a touch gesture, a voice, or a motion) from the control apparatus. A control signal may be extracted from the received optical signal under the control of the controller 1480.

For example, the light receiver 1463 may receive a signal corresponding to a pointing location of the control apparatus and transmit the received signal to the controller 1480. For example, when a UI screen image for receiving data or a command from a user has been output via the display 1415 and the user wants to input data or a command to the display apparatus 1400 via the control apparatus, the user moves the control apparatus while touching a touch pad (not shown) provided in the control apparatus, and, at this time, the light receiver 1463 may receive a signal corresponding to a motion of the control apparatus and transmit the received signal to the controller 1480. The light receiver 1463 may receive a signal indicating that a certain button provided on the control apparatus has been pressed, and transmit the received signal to the controller 1480. For example, when the user presses a button-type touch pad (not shown) provided in the control apparatus with his or her finger, the light receiver 1463 may receive a signal indicating that the button-type touch pad has been pressed, and transmit the received signal to the controller 1480. For example, the signal indicating that the button-type touch pad has been pressed may be used as a signal for selecting one from among items.

The I/O interface 1470 receives video (for example, a moving picture), audio (for example, a voice or music), and additional information (for example, an EPG) from outside the display apparatus 1400 under the control of the controller 1480. The I/O interface 1470 may include a High-Definition Multimedia Interface (HDMI) port 1471, a component jack 1472, a PC port 1473, or a USB port 1474. The I/O interface 1470 may include a combination of the HDMI port 1471, the component jack 1472, the PC port 1473, and the USB port 1474.

It will be understood by one of ordinary skill in the art that the structure and operation of the I/O interface 1470 may be variously implemented according to embodiments.

The controller 1480 controls an overall operation of the display apparatus 1400 and signal transfer among the internal components 1410 through 1490 of the display apparatus 1400 and processes data. When there is an input of a user or stored preset conditions are satisfied, the controller 1480 may execute an operation system (OS) and various applications that are stored in the storage 1490.

The controller 1480 may include RAM (not shown) that stores a signal or data input by an external source of the display apparatus 1400 or is used as a memory area for various operations performed by the display apparatus 1400, ROM (not shown) that stores a control program for controlling the display apparatus 1400, and a processor (not shown).

According to an embodiment, the RAM and the processor included in the controller 1480 may correspond to the RAM 730 and the processor 710 of the electronic apparatus 700 of FIG. 7, respectively.

The processor may include a graphics processing unit (GPU) (not shown) for performing video graphics processing. The processor may be implemented as a system-on-chip (SoC) including a core and a GPU. The processor may include a single core, a dual core, a triple core, a quad core, or a multiple core thereof.

The processor may include a plurality of processors. For example, the processor may be implemented by using a main processor and a sub-processor operating in a sleep mode.

The GPU generates a screen image including various objects, such as an icon, an image, and a text, by using an arithmetic unit and a rendering unit (not shown). The arithmetic unit calculates attribute values, such as a coordinate value, a shape, a size, a color, and the like, with which each object is to be displayed according to layouts of the screen image, by using the user interaction sensed by the sensor 1460. The rendering unit generates screen images of various layouts including objects, based on the attribute values calculated by the arithmetic unit. The screen images generated by the rendering unit are displayed on a display area of the display 1415.

Figure 15:
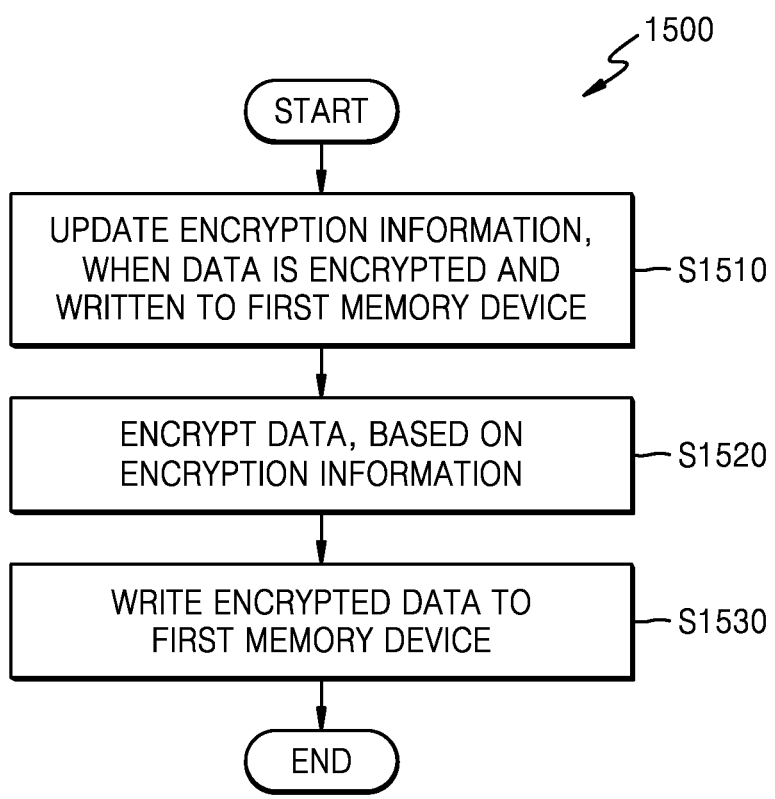
FIG. 15 is a flowchart of a data encryption method, according to an embodiment.

FIG. 15 is a flowchart of a data encryption method according to an embodiment.

Operations included in a data encryption method 1500 according to an embodiment are the same as the operations performed in the electronic apparatuses described above with reference to FIGS. 1 through 13. Accordingly, descriptions of the data encryption method 1500 that are the same as those made with reference to FIGS. 1 through 13 are not repeated herein. The data encryption method 1500 will now be described in detail with reference to the electronic apparatus 600 of FIG. 7.

In operation S1510, when data is encrypted and written to the first memory device 630, encryption information including address information indicating a write location on the first memory device 630 and a parameter for use in encryption is updated. Operation 1510 may be performed by the second memory device 620. The first memory device 630 may write and store at least one piece of data in units of blocks. The address information may include information indicating a location of a block formed between a start address of the block and an end address thereof. The address information and the encryption information including the address information have been described above in detail with reference to FIGS. 8 and 9, and thus detailed descriptions thereof will be omitted.

In detail, operation S1510 of updating the encryption information may include, when a write request for encrypting data and writing the encrypted data to the first memory device 630 is received, changing at least one of the address information and the parameter, based on the write address; updating the encryption information, based on the change; and storing the updated encryption information in the second memory device 620.

The updating of the encryption information has been described above in detail with reference to FIGS. 10 through 12, and thus detailed descriptions thereof will be omitted.

In operation S1520, data is encrypted based on the encryption information. Operation S1520 may be performed by the encryptor 641.

In operation S1530, the data encrypted in operation S1520 is written to the first memory device 630. Operation S1530 may be performed by the encryptor 641 writing the encrypted data to the first memory device 630.

In a data encryption method according to an embodiment and an electronic apparatus performing the data encryption method, when data stored in RAM, which store data in units blocks, is encrypted, the corresponding data is encrypted without using data that is not a target for encryption, thereby minimizing access performance degradation of RAM.

In the data encryption method according to an embodiment and the electronic apparatus performing the data encryption method, when data stored in RAM is encrypted, the same input data is encrypted differently at different encryption time points, thereby increasing a security level.

The above-described embodiments can also be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal, or other transmission mechanism, and includes any information transmission medium. Some embodiments may be implemented as a computer program or a computer program product including instructions executable by a computer.

The particular implementations shown and described herein are merely illustrative embodiments and are not intended to otherwise limit the scope of embodiments in any way. For the sake of brevity, electronics according to the related art, control systems, software development and other functional aspects of the systems may not be described in detail.

What is claimed is:

1. An electronic apparatus comprising:
a first memory;
a second memory configured to store encryption information; and
a processor configured to:
 initialize address information,
 generate the encryption information including the initialized address information indicating a write location of data on the first memory and a parameter for encrypting the data,
 control the second memory to store the encryption information,
 encrypt the data based on the encryption information, control the encrypted data to be written to the write location corresponding to the initialized address information on the first memory, wherein the second memory further configured to:

in response to receiving a write request which requests first data to be written on the first memory, search for encryption information corresponding to the write request, and when the searched encryption information corresponds to the write request, update the encryption information, based on a result of a comparison between the initialized address information and address information corresponding to the write request.

2. The electronic apparatus of claim 1, wherein, when a write request for writing supplemental data to the first memory is received, the second memory is further configured to update at least one of the address information and the parameter for encrypting the data, based on the write request.

3. The electronic apparatus of claim 2, wherein the second memory is further configured to generate first encryption information that is applied when the data is written to the first memory at a first time point, and second encryption information that is applied when the supplemental data is written to the first memory at a second time point different from the first time point, such that the first encryption information is different from the second encryption information.

4. The electronic apparatus of claim 3, wherein the data encrypted at the first time point has a different value from the supplemental data encrypted at the second time point.

5. The electronic apparatus of claim 1, wherein the address information comprises at least two of a start address, an end address, and size information of a memory area from the start address to the end address.

6. The electronic apparatus of claim 1, wherein the second memory comprises a plurality of memory areas, wherein the second memory comprises a cache memory having a structure consisting of a plurality of layers, and the encryption information is stored in a memory area among the plurality of memory areas corresponding to a layer among the plurality of layers.

7. The electronic apparatus of claim 6, wherein, when supplemental data is encrypted and written to the first memory, the second memory is further configured to store supplemental encryption information in a memory area among the plurality of memory areas corresponding to a layer among the plurality of layers that is lower than the layer on which the encryption information is stored.

8. The electronic apparatus of claim 6, wherein, when supplemental data is encrypted and written to the first memory, the second memory is further configured to store supplemental encryption information in the memory area among the plurality of memory areas corresponding to the layer among the plurality of layers on which the encryption information is stored.

9. The electronic apparatus of claim 1, wherein the encryption information comprises:

first layer encryption information comprising the encryption information corresponding to the data; and second layer encryption information comprising encryption information corresponding to supplemental data.

10. The electronic apparatus of claim 1, wherein the second memory is further configured to obtain update address information on the first memory corresponding to a write request with respect to supplemental data which is to be stored in the first memory, and update the encryption information, based on an initial address indicating a location of a first area on which the data is stored in the first memory and the update address information.

11. The electronic apparatus of claim 1, wherein when a read request of the data written to the first memory is received, the second memory is further configured to search for the encryption information corresponding to the data in response to receiving the read request, and the processor is further configured to control to read the data from the first memory and decrypt the data, based on the encryption information.

12. The electronic apparatus of claim 1, wherein the data comprises image frame data, and the processor is further configured to control a plurality of image frames included in the image frame data to be written to the first memory according to a circular queue method.

13. The electronic apparatus of claim 12, wherein the second memory comprises a cache memory having a structure of two layers, and the second memory is configured to store the encryption information in the cache memory according to the circular queue method when encrypting and storing the plurality of image frames to the first memory.

14. The electronic apparatus of claim 1, wherein the first memory is further configured to store the data in units of blocks, and the address information comprises information indicating a location of a block formed between a start address of the block and an end address of the block.

15. The electronic apparatus of claim 1, wherein the first memory is random access memory (RAM), and the second memory is a cache.

16. A data encryption method comprising:

initialize address information;

generating encryption information comprising the initialized address information indicating a write location on a first memory and a parameter for encrypting data, in response to receiving a request to write the data to the first memory;

store the encryption information in a second memory;

encrypting the data, based on the encryption information;

writing the encrypted data to the write location on the first memory;

in response to receiving a write request which requests first data to be written on the first memory, search for encryption information corresponding to the write request, and when the searched encryption information corresponds to the write request, update the encryption information, based on a result of a comparison between the initialized address information and address information corresponding to the write request.

17. The data encryption method of claim 16, wherein the generating comprises:

when a write request for writing supplemental data to the first memory is received, update at least one of the address information and the parameter for encrypting the data, based on the write request; and storing the updated encryption information to a cache memory.

18. The data encryption method of claim 17, wherein the generating comprises generating first encryption information that is applied when the data is written to the first memory at a first time point, and second encryption information that is applied when the supplemental data is written to the first memory at a second time point different from the first time point, such that the first encryption information is different from the second encryption information.

19. The data encryption method of claim 17, further comprising storing the encryption information in a memory area among a plurality of memory areas of the first memory corresponding to a layer among a plurality of layers within the cache memory.

20. The data encryption method of claim 16, wherein the data comprises image frame data including a plurality of image frames, and
the writing comprises writing the plurality of image frames to the first memory according to a circular queue method.

* * * * *